United States Patent [19]

Ardini, Jr. et al.

[11] Patent Number: 4,959,771
[45] Date of Patent: Sep. 25, 1990

[54] WRITE BUFFER FOR A DIGITAL PROCESSING SYSTEM

[75] Inventors: Joseph L. Ardini, Jr., Needham; Steven Small, Waltham, both of Mass.

[73] Assignee: Prime Computer, Inc., Natick, Mass.

[21] Appl. No.: 407,693

[22] Filed: Sep. 14, 1989

Related U.S. Application Data

[63] Continuation of Ser. No. 36,925, Apr. 10, 1987, abandoned.

[51] Int. Cl.⁵ .............................................. G06F 12/00
[52] U.S. Cl. ................................ 364/200; 364/239.1; 364/239.7; 364/246.12
[58] Field of Search ................................. 364/200, 900

[56] References Cited

U.S. PATENT DOCUMENTS 4,433,394  2/1984  Torii et al. ........................... 365/221
4,507,731  3/1985  Morrison ............................. 364/200
4,542,457  9/1985  Mortensen et al. ................. 364/200

*Primary Examiner*—Thomas M. Heckler
*Attorney, Agent, or Firm*—Wolf, Greenfield & Sacks

[57] ABSTRACT

The invention comprises a write buffer system which provides residence time information that increases the merge potential and enhances the write collapse feature of a "smart" buffer. The write buffer has multiple buffer locations for storing data received from a central processor, a data merger for merging data designated by the central processor for subsequent storage in contiguous memory locations, and a write controller for selectively writing the data from the plurality of write buffer locations to the memory. The system further includes time stamp registers in communication with the write controller for storing and updating a time signal representative of the write buffer location having most recently received data. The controller is responsive in part to the time signal, and inhibits the writing to memory of the data in the write buffer location having most recently received data since this is the location most likely to be eligible for a data merge. This feature decreases the number of interruptions to the CPU for data transfer operations.

13 Claims, 27 Drawing Sheets

|   |     |
|---|-----|
| 3 | 100 |
| 2 | 254 |
| 1 |     |
| 0 |     |

ACCESS WRITE BUFFER *11*

|   |     |     |     |     |
|---|-----|-----|-----|-----|
| 3 | 100 | 101 | 102 | 103 |
| 2 | 254 | 255 | 256 | 257 |
| 1 |     |     |     |     |
| 0 |     |     |     |     |

DATA WRITE BUFFER *12*

|   |   |   |   |   | WP |
|---|---|---|---|---|----|
| 3 | 1 | 1 | 0 | 0 | 1  |
| 2 | 0 | 0 | 1 | 0 | 1  |
| 1 | 0 | 0 | 0 | 0 | 0  |
| 0 | 0 | 0 | 0 | 0 | 0  |

VALID WRITE BUFFER *13*

*Fig. 1*

(PRIOR ART)

| | |
|---|---|
| 3 | 100 |
| 2 | 254 |
| 1 | |
| 0 | |

ACCESS WRITE BUFFER

| | | | | |
|---|---|---|---|---|
| 3 | 100 | 101 | 102 | 103 |
| 2 | 254 | 255 | 256 | 257 |
| 1 | | | | |
| 0 | | | | |

DATA WRITE BUFFER

WP

| | | | | | |
|---|---|---|---|---|---|
| 3 | 1 | 1 | 0 | 0 | 1 |
| 2 | $\overline{0}$ | 0 | 1 | 1 | 1 |
| 1 | 0 | 0 | 0 | 0 | 0 |
| 0 | 0 | 0 | 0 | 0 | 0 |

VALID WRITE BUFFER

*Fig. 2*

(PRIOR ART)

ASSOCIATIVE WRITE BUFFER CURRENT INVENTION

|   |     |
|---|-----|
| 3 | 100 |
| 2 | 254 |
| 1 |     |
| 0 |     |

ACCESS WRITE BUFFER

|   |     |     |     |     |
|---|-----|-----|-----|-----|
| 3 | 100 | 101 | 102 | 103 |
| 2 | 254 | 255 | 256 | 257 |
| 1 |     |     |     |     |
| 0 |     |     |     |     |

DATA WRITE BUFFER

|   |   |   |   |   | WP |
|---|---|---|---|---|----|
| 3 | 1 | 1 | 0 | 0 | 1  |
| 2 | 0 | 0 | 1 | 1 | 1  |
| 1 | 0 | 0 | 0 | 0 | 0  |
| 0 | 0 | 0 | 0 | 0 | 0  |

VALID WRITE BUFFER

| 2 | 1st |
| 3 | 2nd |
|   | 3rd |
|   | 4th |

TIME STAMP REGISTERS

*Fig. 5*

ASSOCIATIVE WRITE BUFFER CURRENT INVENTION

| | |
|---|---|
| 3 | 100 |
| 2 | 254 |
| 1 | 74 |
| 0 | |

ACCESS WRITE BUFFER

| | | | | |
|---|---|---|---|---|
| 3 | 100 | 101 | 102 | 103 |
| 2 | 254 | 255 | 256 | 257 |
| 1 | 74 | 75 | 76 | 77 |
| 0 | | | | |

DATA WRITE BUFFER

WP

| | | | | | |
|---|---|---|---|---|---|
| 3 | 1 | 1 | 0 | 0 | 1 |
| 2 | 0 | 0 | 1 | 1 | 1 |
| 1 | 0 | 0 | 1 | 1 | 1 |
| 0 | 0 | 0 | 0 | 0 | 0 |

VALID WRITE BUFFER

| | |
|---|---|
| 1 | 1st |
| 2 | 2nd |
| 3 | 3rd |
| | 4th |

TIME STAMP REGISTERS

*Fig. 6*

ASSOCIATIVE WRITE BUFFER PREFERRED MODIFICATION

| | |
|---|---|
| 3 | 100 |
| 2 | 254 |
| 1 | 74 |
| 0 | |

ACCESS WRITE BUFFER

| | | | | |
|---|---|---|---|---|
| 3 | 100 | 101 | 102 | 103 |
| 2 | 254 | 255 | 256 | 257 |
| 1 | 74 | 75 | 76 | 77 |
| 0 | | | | |

DATA WRITE BUFFER

WP

| | | | | | |
|---|---|---|---|---|---|
| 3 | 1 | 1 | 0 | 0 | 1 |
| 2 | 0 | 0 | 1 | 1 | 1 |
| 1 | 0 | 0 | 1 | 1 | 1 |
| 0 | 0 | 0 | 0 | 0 | 0 |

VALID WRITE BUFFER

| 1 |
|---|

LAST WRITTEN REGISTER

*Fig. 7*

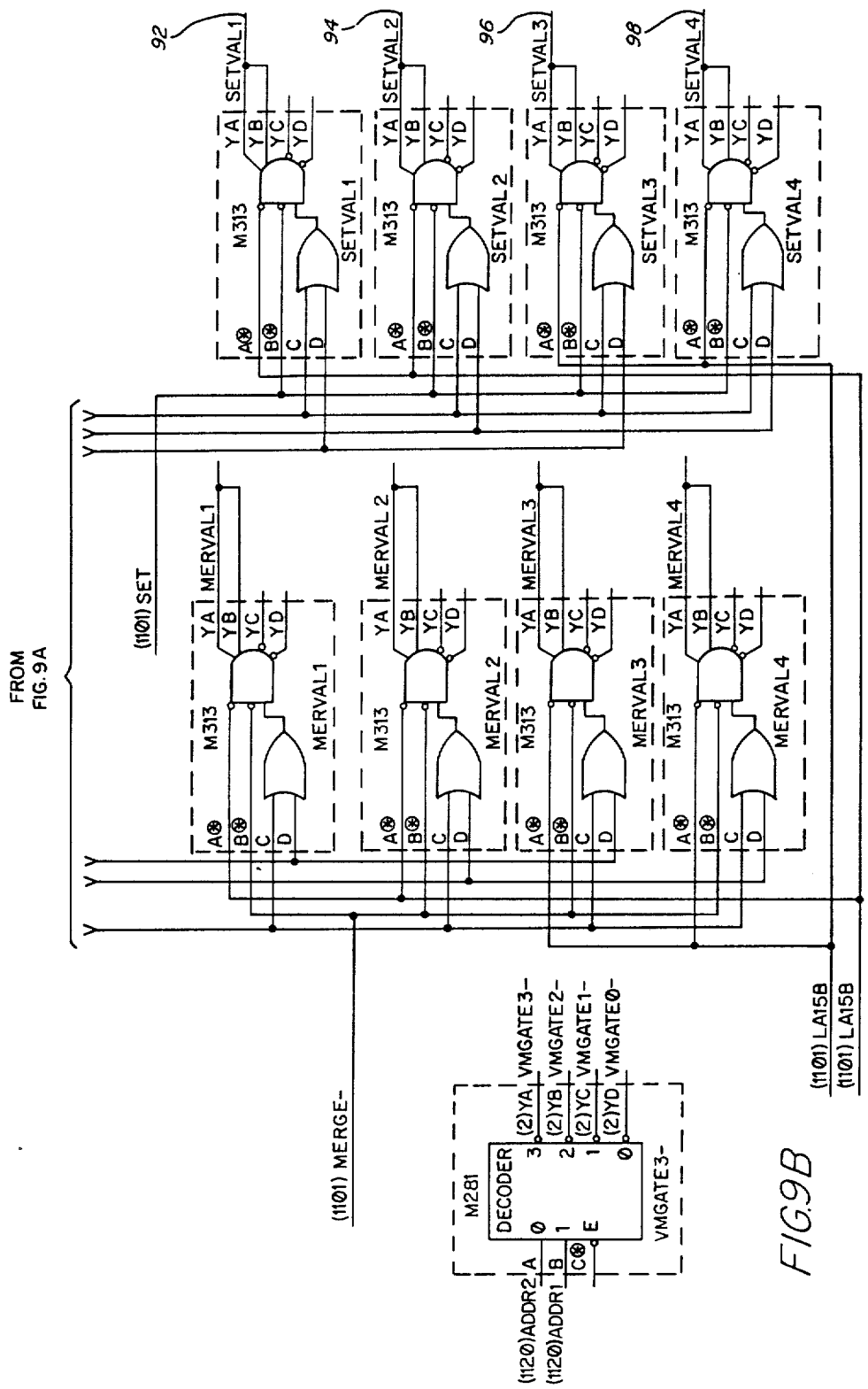

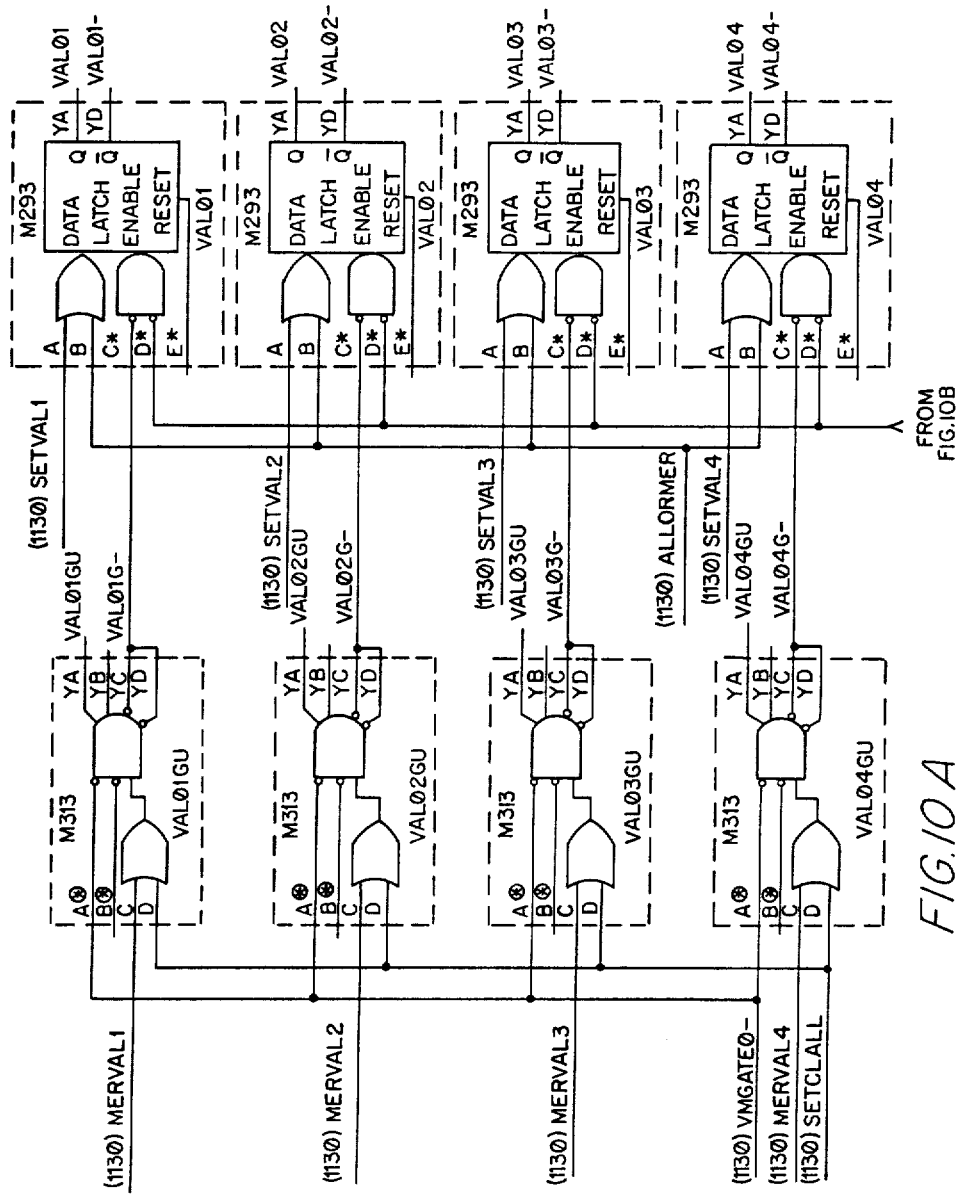
FIG.IOA

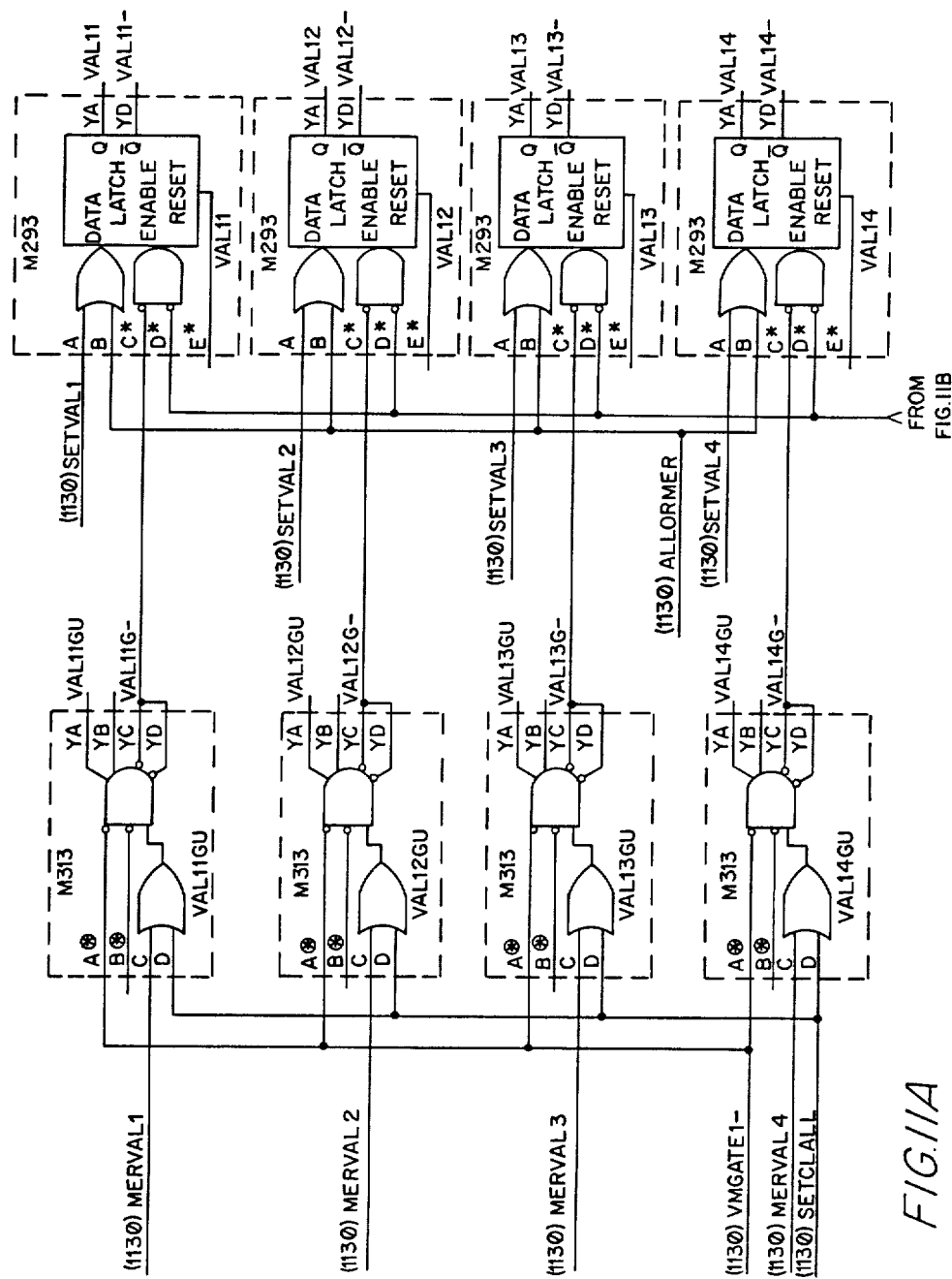

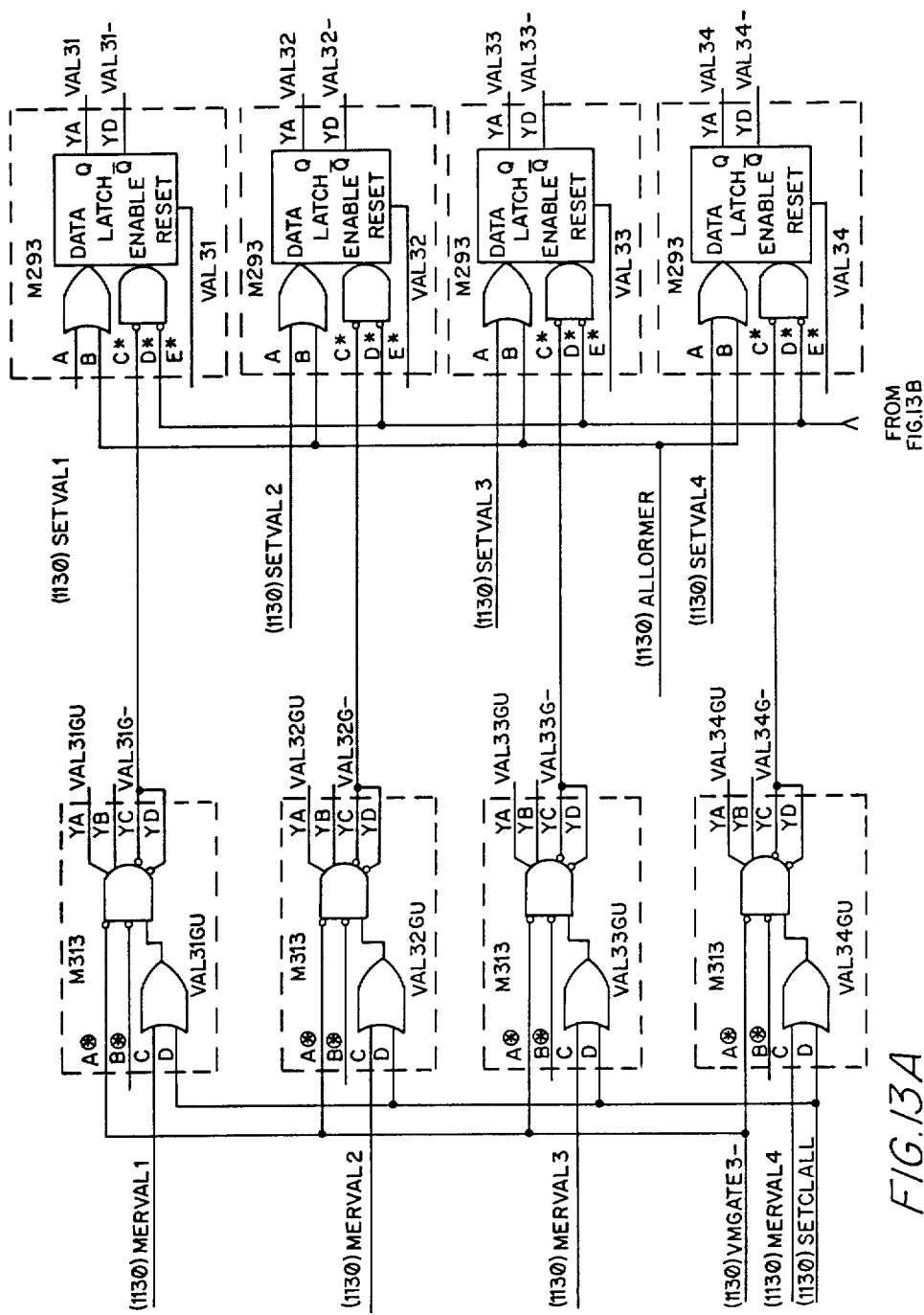

WRITE BUFFER FOR A DIGITAL PROCESSING SYSTEM

This application is a continuation of application Ser. No. 036,925, filed Apr. 10, 1987, now abandoned.

BACKGROUND OF THE INVENTION

This application is related to U.S. patent application Ser. No. 629,349 of Lefsky, filed July 10, 1984, now U.S. Pat. No. 4,750,154 and incorporates that application herein by reference.

This invention relates to data processing apparatus having a central processor, a memory and a write buffer associated with said memory. More particularly, the invention relates to apparatus and methods for improving the transfer of data between processors or other input/output devices and memory or data storage devices.

High speed computer systems employ memory devices to store data generated or modified by a central processing unit (CPU). The transfer of the data from the CPU to the memory is typically referred to as a "write operation" or a "write." The transfer of data from the memory to the CPU is referred to as a "read operation" or a "read." In most computer systems, the memory bus, across which multiple bit data words are transferred in parallel, is the same width as the buses employed by the processor to manipulate or generate data. Typically, processors operate on 16 bit or 32 bit data words.

When a processor performs successive write instructions, performance is compromised because the time required to transfer data to memory is much greater than the processor's internal data manipulation cycle time. The processor must wait until each write instruction has been performed before continuing operations.

The conventional method for reducing such Performance costs during the transfer of data from a processor to memory has been to employ a first-in, first-out (FIFO) buffer to store data strings until the buffer is full or a break in processing operations occurs, at which time the buffer entries are unloaded serially into the memory. Such a FIFO buffer is known as a "write buffer".

Write buffers have accordingly been used in high speed computer systems to smooth the flow of data between the central processor and the memory during write operations, as well as to keep the data paths between the two free for read operations.

An associative, "smart" write buffer arrangement is disclosed in U.S. patent application Ser. No. 629,349 of Lefsky, filed July 10, 1984. In the write buffer system disclosed therein, data is accepted by the write buffer as it arrives from the central processor where it is saved temporarily. If subsequent data reaching the write buffer is destined for a memory location which is contiguous to that for which the previously stored data is destined, the two pieces of data are merged inside the write buffer. The merged data is thereafter transferred to memory in a single write operation. Thus only one write operation need be seen by the memory for the two data words, resulting in a significant improvement in speed for the system, provided that wider data words can be written from the write buffer to the memory than can be written from the CPU to the write buffer.

Generally, in such systems it is desirable to save a data word as long as possible in the write buffer, with the expectation that a subsequently received data word will allow such merging to occur. Preferrably, this saving of data would continue until the length of the contiguous data equals the maximum length word the memory can accept at one time.

The value of a write buffer is dependent upon its depth as well as the type of operation being performed by the processor. Where each write operation addresses a separate location in the buffer, the data words to be written to memory must be unloaded individually. Hence, a series of write instructions can quickly fill even a large write buffer, and a typical write buffer has only four locations. When the buffer is full it cannot accept any more data from the central processor, delaying the processor and causing the problem the buffer was designed to relieve. The procedure used to extract data from the write buffer must accordingly seek to balance the two opposing requirements of maximizing buffer residence time while avoiding buffer filling.

In a FIFO write buffer, data is entered into the buffer in a clear sequential format. In a "smart" write buffer such as that disclosed in U.S. patent application Ser. No. 629,349, data is not maintained in the sequence in which it entered. Instead, data strings are merged whenever possible. There is accordingly no information about the residence time of data in the buffer. Consequently, some data may be resident in the buffer for relatively long time periods, thereby compromising the ability of the system to efficiently write to memory.

Accordingly, it is an object of the invention to provide data processing apparatus having a write buffer from which data strings are selected for writing to memory on the basis of each candidate's residence time and likelihood of merging with data coming from a future CPU write operation.

SUMMARY OF THE INVENTION

The invention discloses a write buffer system which provides residence time information that increases the merge potential and enhances the write collapse feature of a "smart" buffer, allowing the CPU to continue operations with fewer interruptions for data transfer. Such a system boosts the performance of the entire computer system in which it is implemented and satisfies a long-felt need in the industry. More particularly, the invention addresses the problems of the prior art write buffer system by exploiting software locality of reference to resolve the buffer emptying problem. If a computer program references memory location X, the probability is extremely high that the program's next access will be to the location $X+1$. The implication of this principle on associative write buffers is that the probability of a merge occurring on an ensuing write is much greater for the data received most recently than for any other resident data. With the addition of information about the residence time of each data word, a more efficient procedure can be implemented for selecting data words for writing to memory.

The invention includes a digital processing system comprising a central processor, a memory having a plurality of memory locations, and a write buffer operatively associated with said memory. The write buffer includes n write buffer locations for storing data received from the central Processor, where n is an integer greater than one; a data merger for merging data designated by the central processor for subsequent storage in contiguous locations in the memory; and a write controller for selectively writing the data from the plurality of write buffer locations to the memory. The system also includes time stamp registers, in communication with the write controller, for storing and updating a time signal representative of the write buffer location having most recently received data. The system further includes a controller, responsive in part to the time signal, for controlling the write controller to select data for writing to memory from data stored in a candidate set of the locations in the write buffer, the candidate set not including the location represented by said time signal. The writing is accomplished so that data in the location represented by the time signal are disregarded as candidates for writing to memory and are stored pending the arrival of additional data.

BRIEF DESCRIPTION OF DRAWINGS

For a fuller understanding of the nature and objects of the invention, reference should be made to the following detailed description and the accompanying drawings in which:

FIG. 1 is a block diagram of a write buffer utilized in accordance with the prior art;

FIG. 2 is a block diagram of the write buffer of FIG. 1, showing further buffer filling;

FIG. 5 is a block diagram of a write buffer utilized in accordance with the invention, showing time stamp registers (TSRs);

FIG. 6 is a block diagram of the write buffer of FIG. 5, showing further buffer filling; and FIG. 7 is a block diagram of another embodiment of the invention, showing a last written register (LWR).

FIGS. 9A-9B are a schematic diagram of the input stage of the valid and write pending flags register section of FIG. 4.

FIGS. 10A-10B, 11A-11B, 12A-12B, and 13A-13B are schematic diagrams of the actual valid and write pending flag registers.

DESCRIPTION OF ILLUSTRATED EMBODIMENTS

Figure 3:
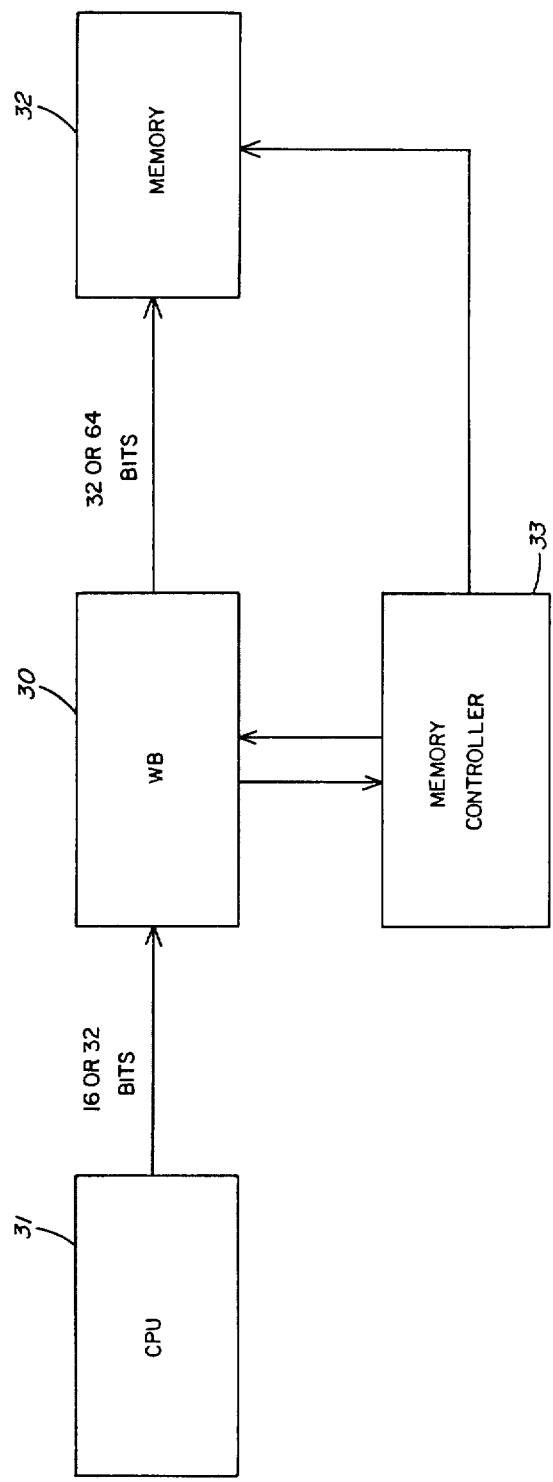
FIG. 3 is a block diagram of a hardware implementation of the invention, showing the functional relationship between CPU, write buffer, memory, and memory controller.

FIG. 1 illustrates the operation of a "smart" write buffer system in accordance with the teachings of U.S. patent application Ser. No. 629,349. It shows, as an example, a write buffer which is 64 bits wide and 4 locations deep. The illustrated buffer can accept 16 or 32 bit data from the central processor while writing 32 or 64 bit data to the main memory. A write buffer system can be implemented for any memory width or depth.

The buffer illustrated in FIG. 1 consists of three major sections: the Address Write Buffer (AWB)11, the Data Write Buffer (DWB)12, and the Valid Write Buffer (VWB)13. Each section is four locations deep.

The AWB locations are wide enough to hold a physical memory address, as determined by the amount of memory in the system. Each location contains a MOD 4 address corresponding to the eventual memory location where the data will be written. When new data is about to be sent from the central processor (CPU) the AWB compares the new address with the addresses already resident in the AWB. If a match is found a merge operation will occur. If no match is found, an empty location is allocated to store the new data. The AWB accordingly provides a pointer to the locations to be used during a write operation.

The DWB 12 holds the corresponding data. Each location in a typical write buffer DWB is 64 bits wide, divided into four 16 bit sections because the CPU can send data in 16 or 32 bit sections.

Each location of a typical VWB is 5 bits wide. The first four of these bits are referred to as validity bits, and indicate whether the data in the DWB is valid data. There is one validity bit for each 16 bit section in the illustrated DWB. The last bit of each location is known as a "write pending" bit, and indicates whether the data in the DWB is waiting to be written to memory. The write pending flag bit for a given VWB location is set to logic "1" whenever the CPU sends data to the write buffer destined for memory. The flag is cleared when data corresponding to the given VWB location is written to memory.

In operation, an emptying procedure is used to select a data string for writing from the write buffer to the main memory. For interleaved memory systems like those used by most high speed computer systems, if time T is needed to write 32 aligned bits, writing 64 bits requires time T+e, where e is a small fraction of T. A 32 bit string of data is aligned if the 32 bits are the first 32 or the last 32 bits of a 64 bit word. A large time savings is thus gained by writing a single 64 bit string instead of two 32 bit strings. Moreover, as much as 4T time may be required to write 16, 48, or 32 unaligned bits, since the memory must first be read to fill in the gaps in the data before the write operation can be executed. Such a read operation typically takes as much as 3T time.

It is accordingly most efficient to execute write operations in the following order: 64 bit strings, "aligned" 32 bit strings, and "other" strings. "Other" strings should be saved as long as possible to avoid paying the penalty of reading the memory to fill in the gaps in the data strings. These considerations lead to the following emptying procedure used by the prior art:

1. Write any 64 bit quantities.

2. If no 64 bit quantities exist, write any aligned 32 bit quantities if two write pending bits are set in the buffer 13. If only one write pending bit is set, these quantities are saved.

3. If neither 64 bit nor aligned 32 bit quantities exist, read the data to fill in the gaps in any "other" data quantity if three write pending bits are set. This will yield a 64 bit or an aligned 32 bit quantity and one of the above criteria will be met. If two or fewer write pending bits are set, these quantities are saved.

4. If none of the above is true, take no action, pending the arrival of additional data.

While generally effective, the prior art "smart" write buffer system has some associated deficiencies. More particularly, when choosing between two aligned 32 bit quantities or three "other" quantities, the choice is made at random. There is no determination as to which of the candidates is more likely to successfully merge with data coming from future CPU write operations, and therefore would be the better candidate to save.

In the illustration of FIG. 1, the contents of a prior art write buffer system are shown after a sequence of write operations. In a first write operation, 32 bits of data were written to location 100. The Address Write Buffer 11 had been emptied and a pointer is set to the location 3 for the incoming data. The sections of location 3 of DWB 12 accordingly correspond to locations 100 through 103 as shown. The validity bits corresponding to locations 100 and 101 have been set in location 3 of the VWB 13, as has the write pending bit. Next in this example, a 16 bit write operation to location 256 was called for by the CPU. The address did not match any of the addresses already in the AWB 11, so the AWB 11 allocated AWB location 2 for the data. Again, the correspondences are shown in the DWB 12 and VWB 13.

If succeeding write operations dictated by the CPU are to locations 100 through 103 or 254 through 257, a merge operation occurs. One such operation is shown in FIG. 2, where a 16-bit write operation is executed to location 257. The only change compared to FIG. 1 is that an additional validity bit is set in VWB location 2. The data are also written into DWB location 2. The prior art system thus provides a write buffer for storing and merging data for write operations, but provides no information about data residence time. Consequently, in the prior art write buffer, no determination is made as to which resident data is most likely to merge with data from future CPU write operations. In contrast, the write buffer of the invention provides and utilizes data residence time information, in a manner which will now be described.

FIG. 3 is a block diagram of a write buffer system 30 according to the invention. Write buffer system 30 is disposed between a central processing unit (CPU)31 and a memory 32. The write buffer 30 receives signals from, and sends signals to, a memory controller 33, which controls memory 32. Memory controller 33 can be a conventional controller for unloading write instructions from buffer 30 into memory, operating at appropriate times during the operations cycle of the system.

Figure 4:
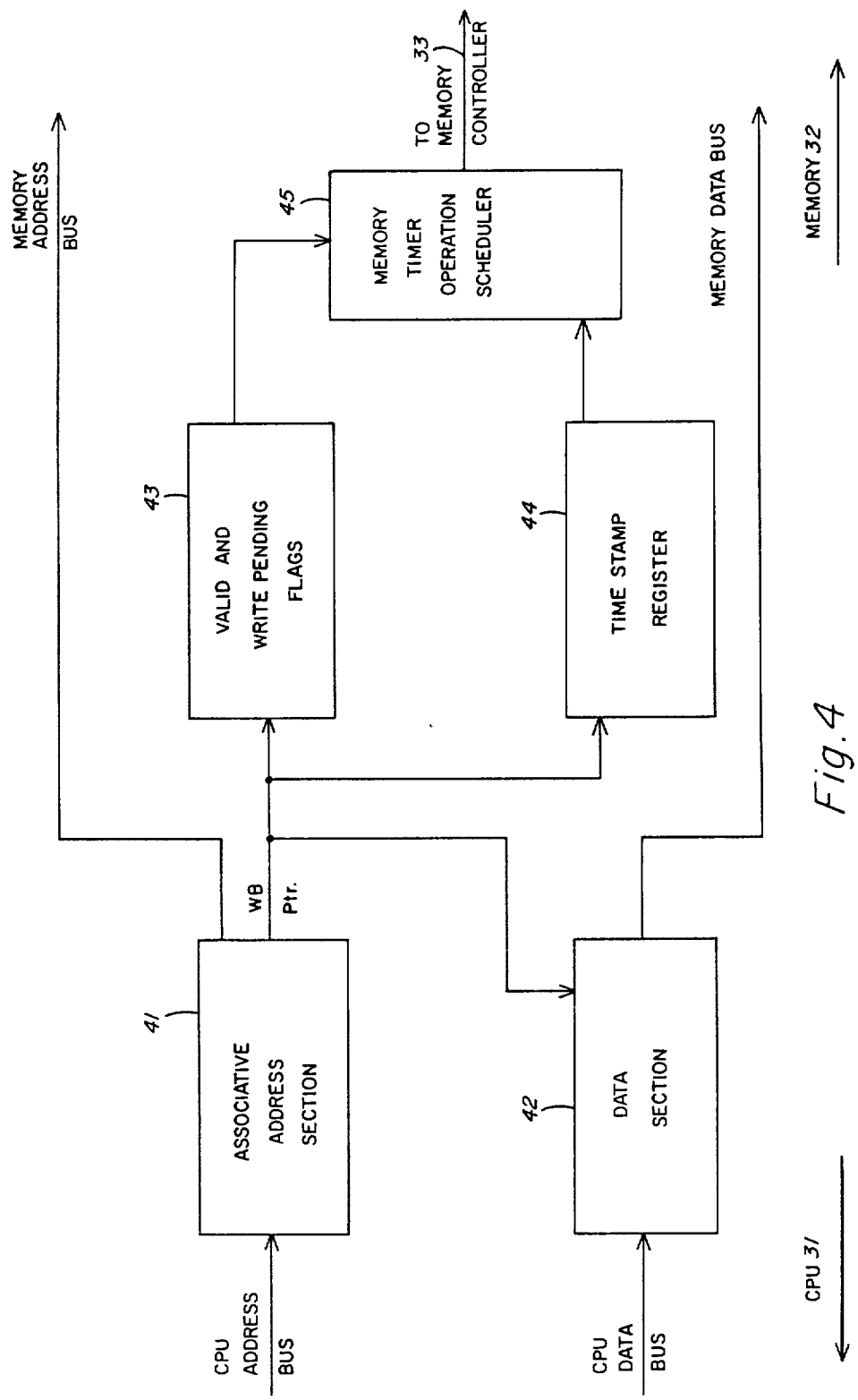
FIG. 4 is a block diagram of a hardware implementation of the invention.

FIG. 4 is another block diagram of a write buffer system 30 according to the invention giving detail of write buffer 30. Write buffer system 30 includes associative address section 41, and data section 42. In a preferred embodiment, the write buffer system also includes flag section 43, time stamp register (TSR) section 44, and memory timer operation scheduler 45.

This preferred embodiment therefore includes some elements similar to those described in conjunction with FIGS. 1 and 2, which illustrate a prior art smart write buffer system, but this embodiment of the invention further includes flag and TSR sections together with an operation scheduler. These latter elements serve generally to control the sequence in which data strings are written to memory, and provide an efficient procedure for executing write operations, as described below.

FIG. 5 illustrates the operation of the system of FIG. 4 in implementing a "Least Recently Used" (LRU) procedure. Four Time Stamp Registers (TSRs) are added, each 2 bits wide. The TSRs are modified push-down registers, each having a chronological sequence of pointers, or numbers. These registers are updated each time the write buffer receives data from a CPU write operation. The first TSR always contains a number corresponding to the write buffer location which has most recently received data. The second and third TSRs contain a number corresponding to the second and third most recently written locations, respectively. FIG. 5 illustrates the contents of these registers for the presently described embodiment of the invention, as they would appear at the end of the write sequence discussed in FIGS. 1 and 2. The first TSR contains a 2 because the last write operation was to address 257, which is being stored in write buffer location 2. Prior to that was a write to address 256, and prior to that was a write to address 100. Because address 100 is being stored in write buffer location 3, a 3 appears in the second TSR.

FIG. 6 shows the state of all write buffer components after a subsequent 32 bit write to location 76.

With the addition of the information contained in the TSRs and operational control provided by scheduler 45, a more efficient emptying procedure is implemented for selecting data to write from buffer 30 to memory. That procedure is in accordance with the following rules:

1. Disregard the data in the location pointed to by the first TSR as a candidate for being written out. This data will only be written if the write buffer is deliberately being emptied.

2. If more than one 64 bit quantity is ready to be written out, select the quantity in the location corresponding to the fourth TSR first, followed by the quantities in locations pointed to by the third and second TSRs.

3. If only one 64 bit quantity is ready, write it out.

4. If no 64 bit quantities remain and more than one aligned 32 bit quantity is ready to be written out, select the quantity in the location corresponding to the fourth TSR first, followed by the third and second TSRs.

5. If only one aligned 32 bit quantity is ready, write it out.

6. If no 64 or aligned 32 bit quantities remain, and three or more "other" quantities are present, read the data from memory to fill in the gaps in the location corresponding to the highest valid TSR. After this operation one of the above criteria will be true.

7. If none of the above is true, take no action, pending the arrival of additional data.

Figure 20:
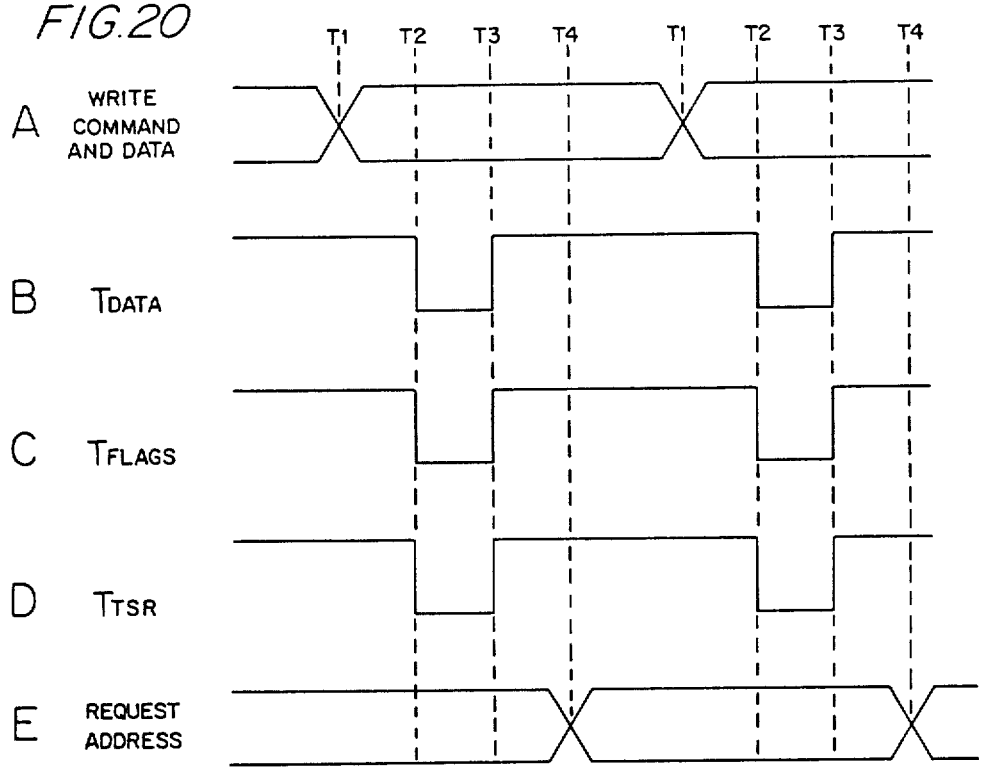
FIG. 20 is a timing diagram showing the relative timing for transfer of information between the elements of the write buffer of the present invention in response to a write command.

FIG. 20 shows a diagram illustrating the timing for transfer of information between the elements of the write buffer of the present invention in response to a write command. FIG. 20A shows the write command plus data from the CPU of the system (or possibly the memory controller, if a read from memory is being performed for the purpose of filling in the gaps in the data register) at time T1. A delay period after the write command and data is issued, the latches for the data section 42, valid and write pending flag section 43 and time stamp register 44 go low at time T2 to allow the new data to be entered into the respective latches. At T3, the new data is once again latched. A short period thereafter, at time T4, the output of the memory timer operation scheduler 45 changes in response to the new data from the time stamp register and valid and write pending flag registers.

Figure 21:
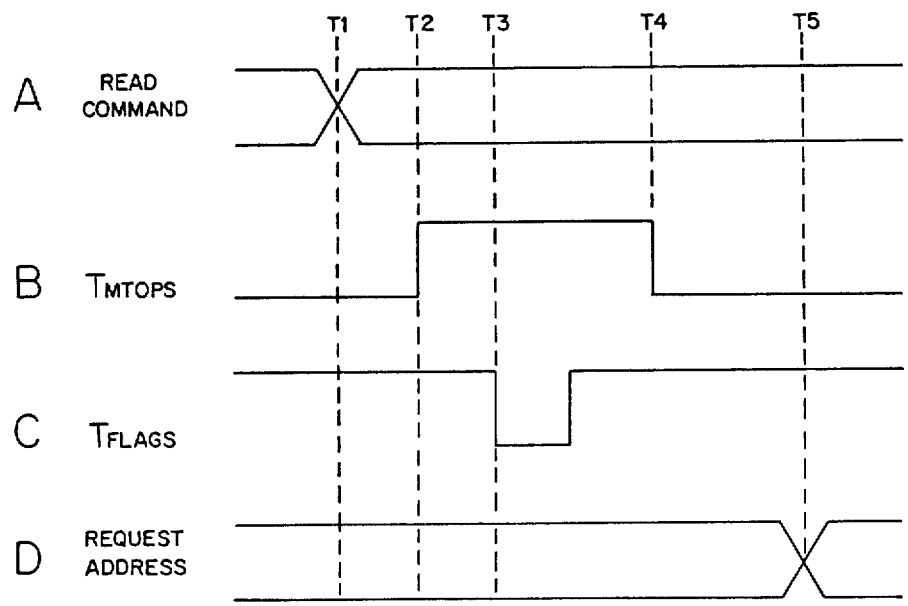
FIG. 21 shows a timing diagram illustrating the relative timing for transfer of information between the elements of the write buffer of the present invention in response to a read command.

FIG. 21 shows the relative timing of the elements of the write buffer in response to a read command for reading data out of the write buffer into memory. The timing requirements between the write buffer and other components of the system such as the CPU, memory controller and memory is not shown. The read command is received at time T1 and a read operation is performed (not shown by timing diagram) according to the data present at the output of the memory timer operation scheduler at time T1. In response to the read command, at time T2, the output latches of memory timer operation scheduler 45 go high to latch the data at their input in order to prevent internal race conditions from prevailing. At time T3, the latches for the valid and write pending flag register section 43 go low to allow these registers to be reset so that they correspond to the new condition of data section 42 after the read operation is performed. At time T4, the output latches of memory timer operation scheduler 45 go low allowing the output of section 45 to change in response to the new data in valid and write pending flag section 43. Shortly thereafter, at time T5, the output of memory timer operation scheduler 45 changes. It should be noted that the data section 42 and the time stamp register section 44 are not updated at this point and must only be updated after the next write of information to the write buffer. The information that the data in the register which was read from is no longer pending is contained in the valid and write pending flags registers. This information is all that is necessary for the memory timer operation scheduler 45 to calculate the register which is to be read in response to the next read command. Only when new data is entered into the write buffer, will data section 42 and time stamp register 44 be updated as shown in FIG. 20.

In an alternative embodiment of the invention, a single TSR is used. The one TSR used is the first TSR, and it is referred to as the Last Written Register (LWR). FIG. 7 illustrates the operation of such a write buffer system, in connection with the write sequence illustrated in FIGS. 1, 2, and 6.

In this embodiment, the location corresponding to the number in LWR is disregarded as a candidate for being written out to memory, and selections between equivalent quantities are decided at random. The selection procedure in this embodiment is:

1. Disregard the data in the location pointed to by LWR as a candidate for being written out. This data will only be written if the write buffer is deliberately being emptied.

2. If more than one 64 bit quantity is ready to be written out, select one at random and write it out.

3. If only one 64 bit quantity is ready, write it out.

4. If no 64 bit quantities remain and more than one aligned 32 bit quantity is ready to be written out, choose one and write it out.

5. If only one aligned 32 bit quantity is ready, write it out.

6. If no 64 or aligned 32 bit quantities remain and three or more "other" quantities are present, read the data from memory to fill in the gaps in one of them. After this operation one of the above criteria will be true.

7. In none of the above is true, take no action.

This single-TSR embodiment of the invention is simple to implement, but still produces a significant improvement in performance. Detailed block diagrams illustrating the components and construction of this embodiment of the invention are shown in FIGS. 8-19 and Appendix I (which can be found in the application file).

Figure 8:
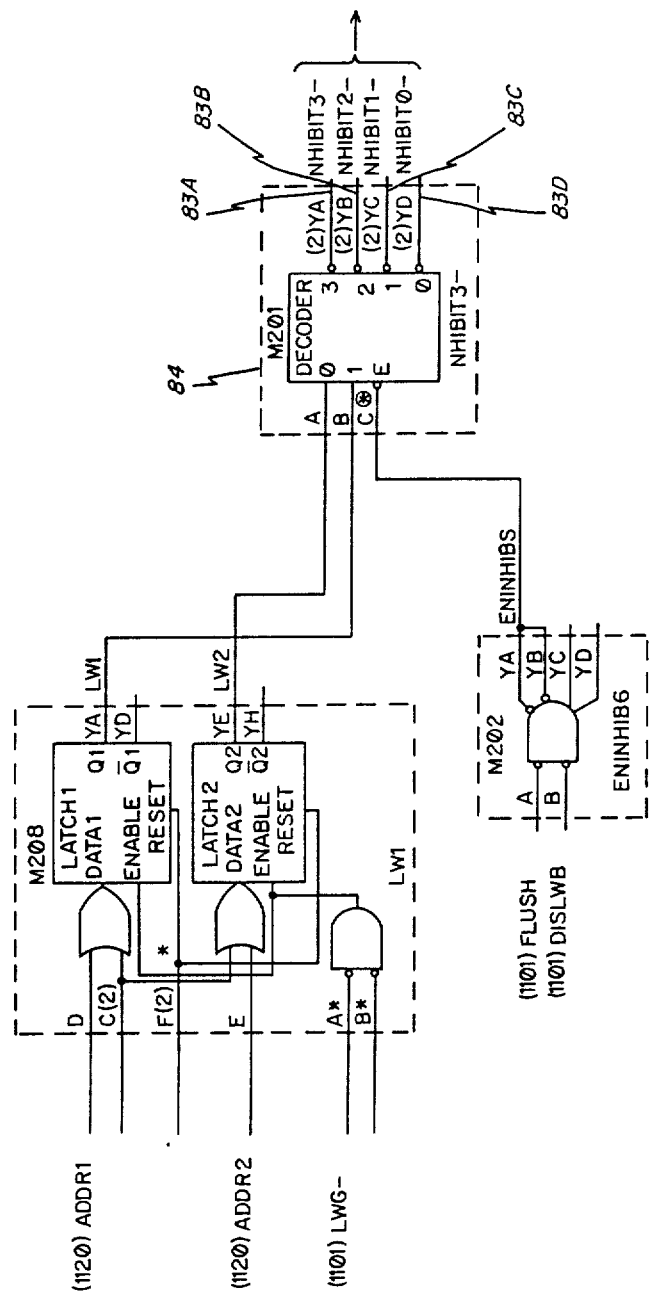
FIG. 8 is a schematic diagram of the last written register shown in FIG. 7.

FIG. 8 shows a schematic diagram of the internal structure of the last written register of FIG. 7. The two-bit latch shown at 82 contains the two bit address of the last written register. The inputs to the two bit latch 82 are supplied from the write buffer pointer as shown in FIG. 4. The two bit address is provided to decoder 84 which places an inhibit signal on one of its four output lines 83A, 83B, 83C and 83D corresponding to the register which was last written to. These outputs are supplied to the memory timer operation scheduler 45 where the information is used for determining the next data register to be read out of the buffer.

Four of the latch/decoder combinations shown in FIG. 8 can be stacked to form the four register push-down stack of the time stamp register 44 shown in FIGS. 5 and 6. Such an arrangement should be obvious to a person skilled in the art.

Figure 9A:
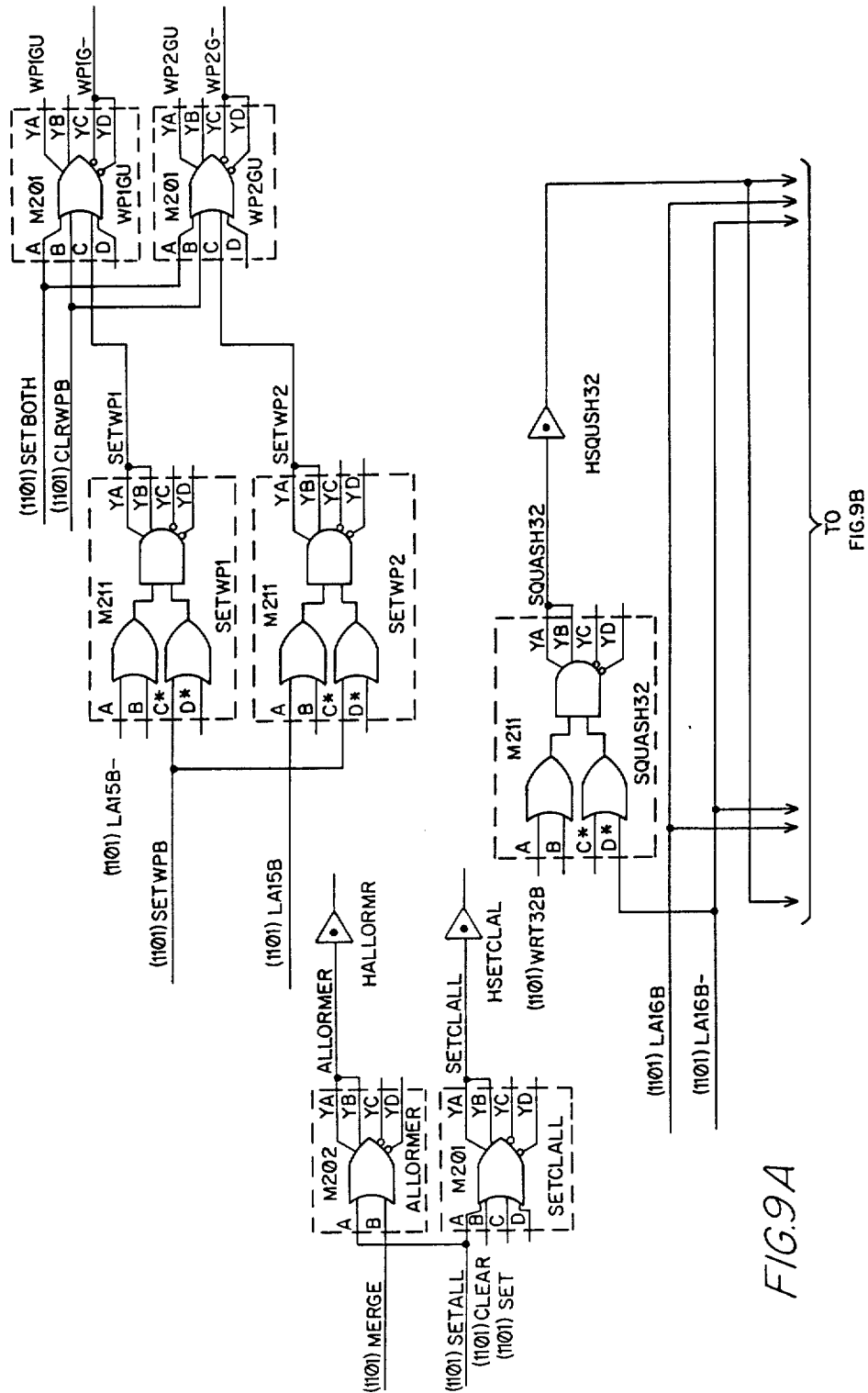
Figure 10B:
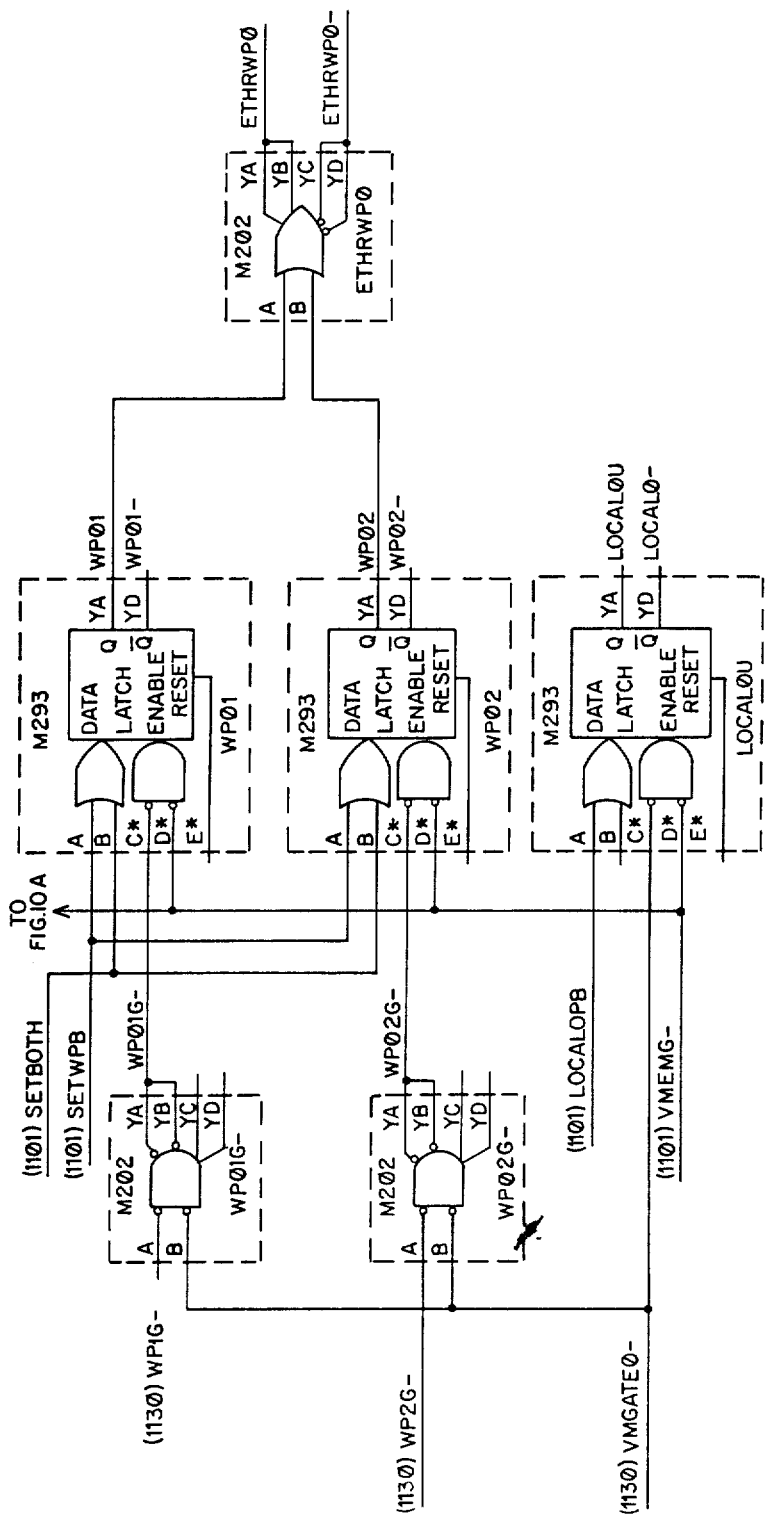
Figure 11B:
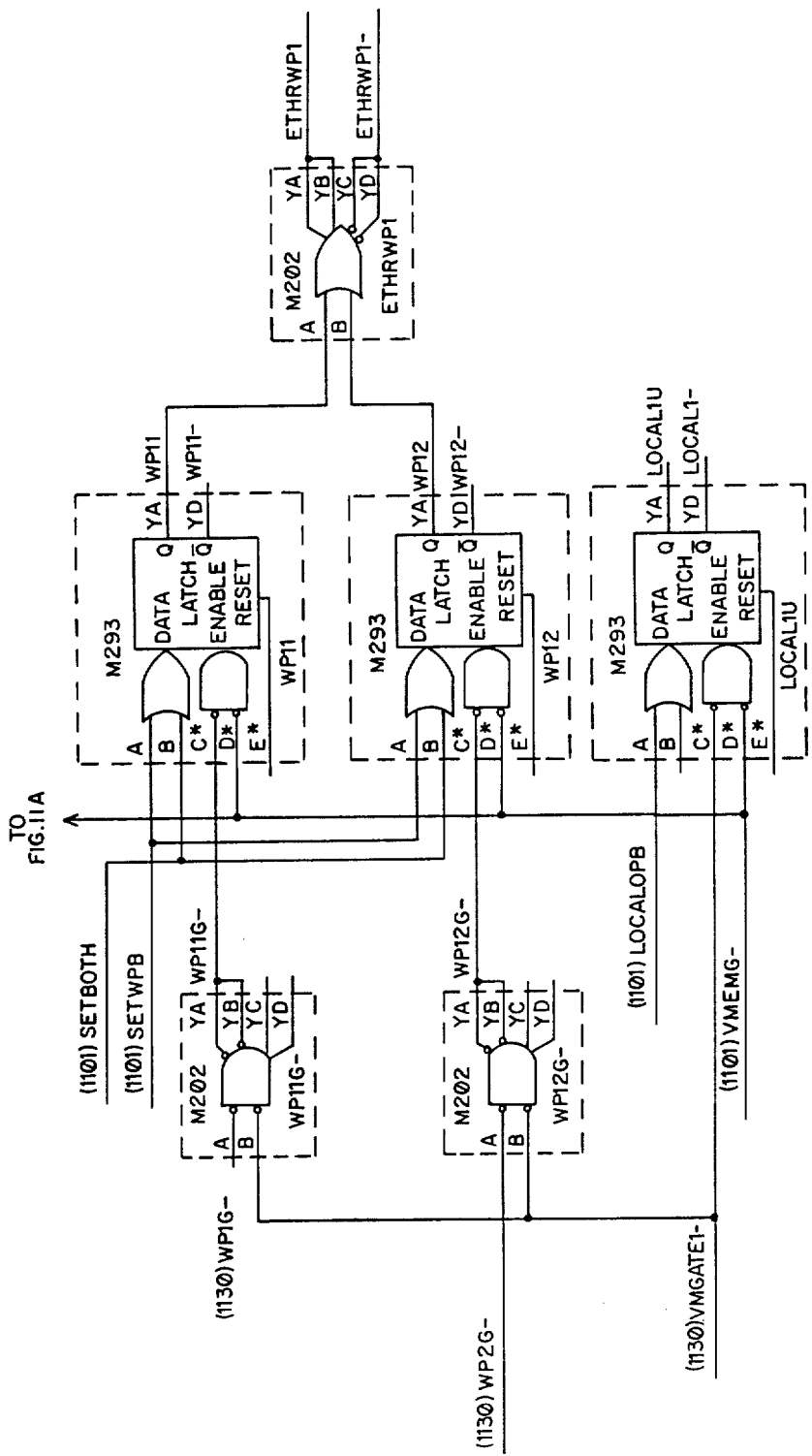
Figure 12A:
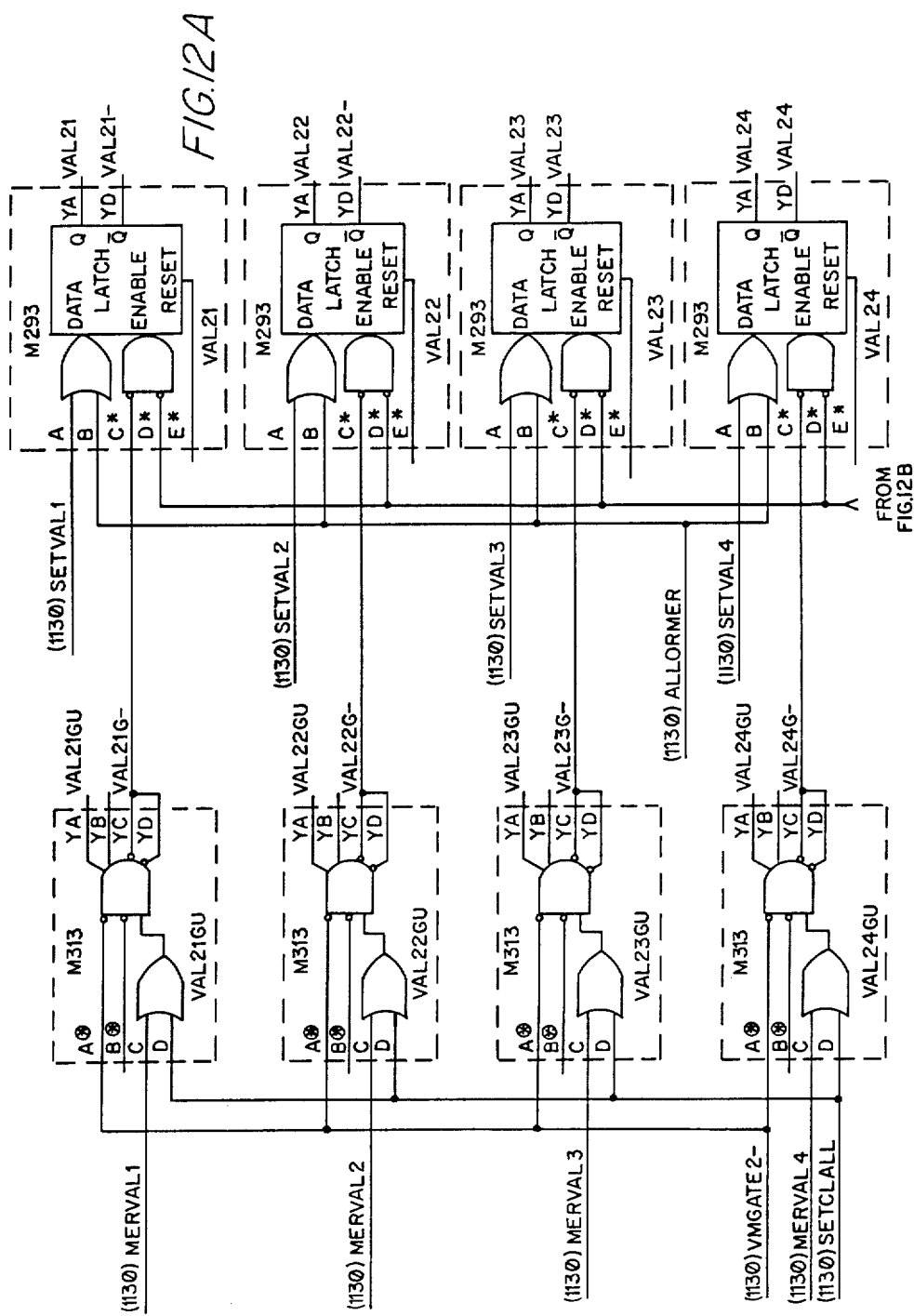
Figure 12B:
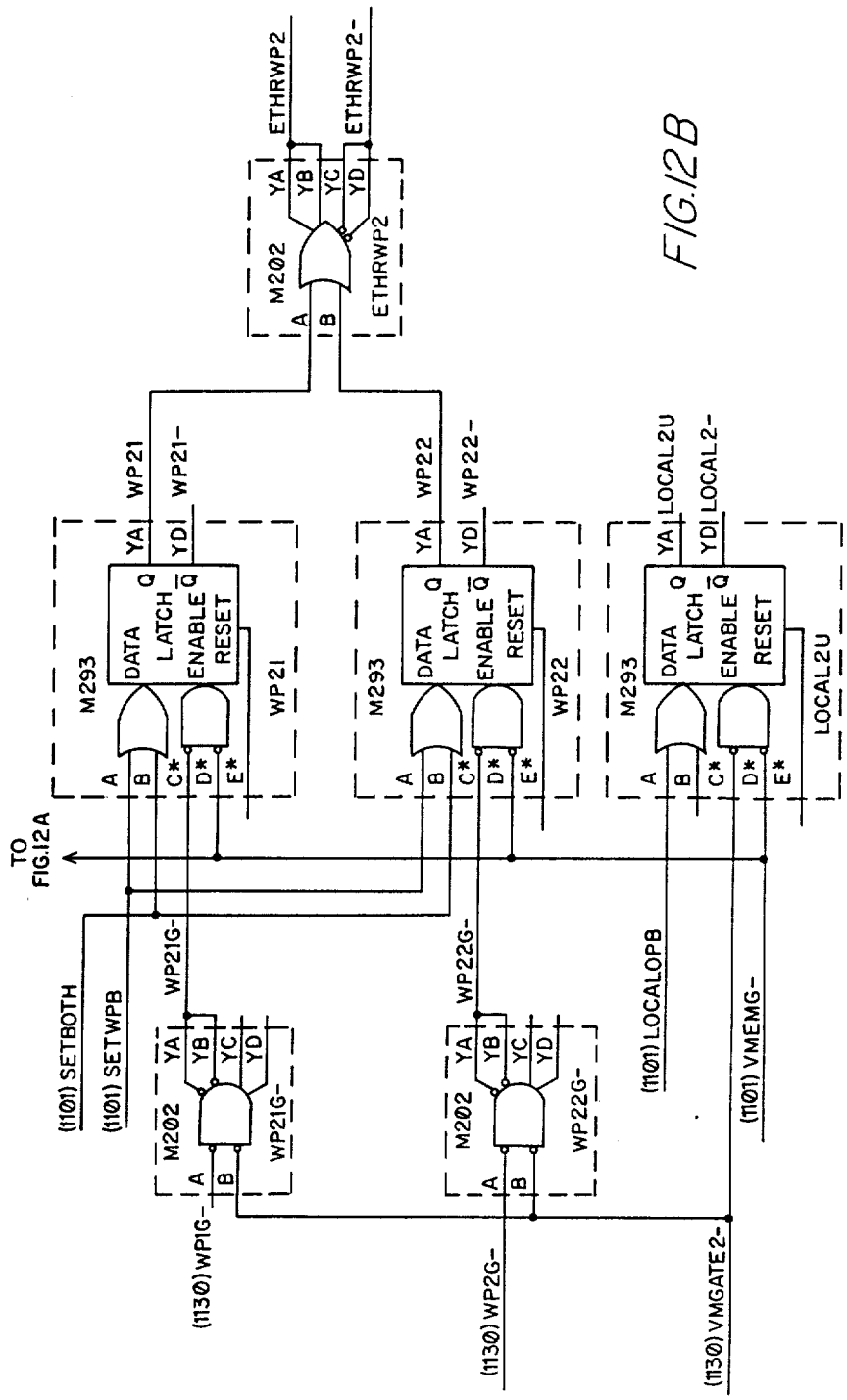
Figure 13B:
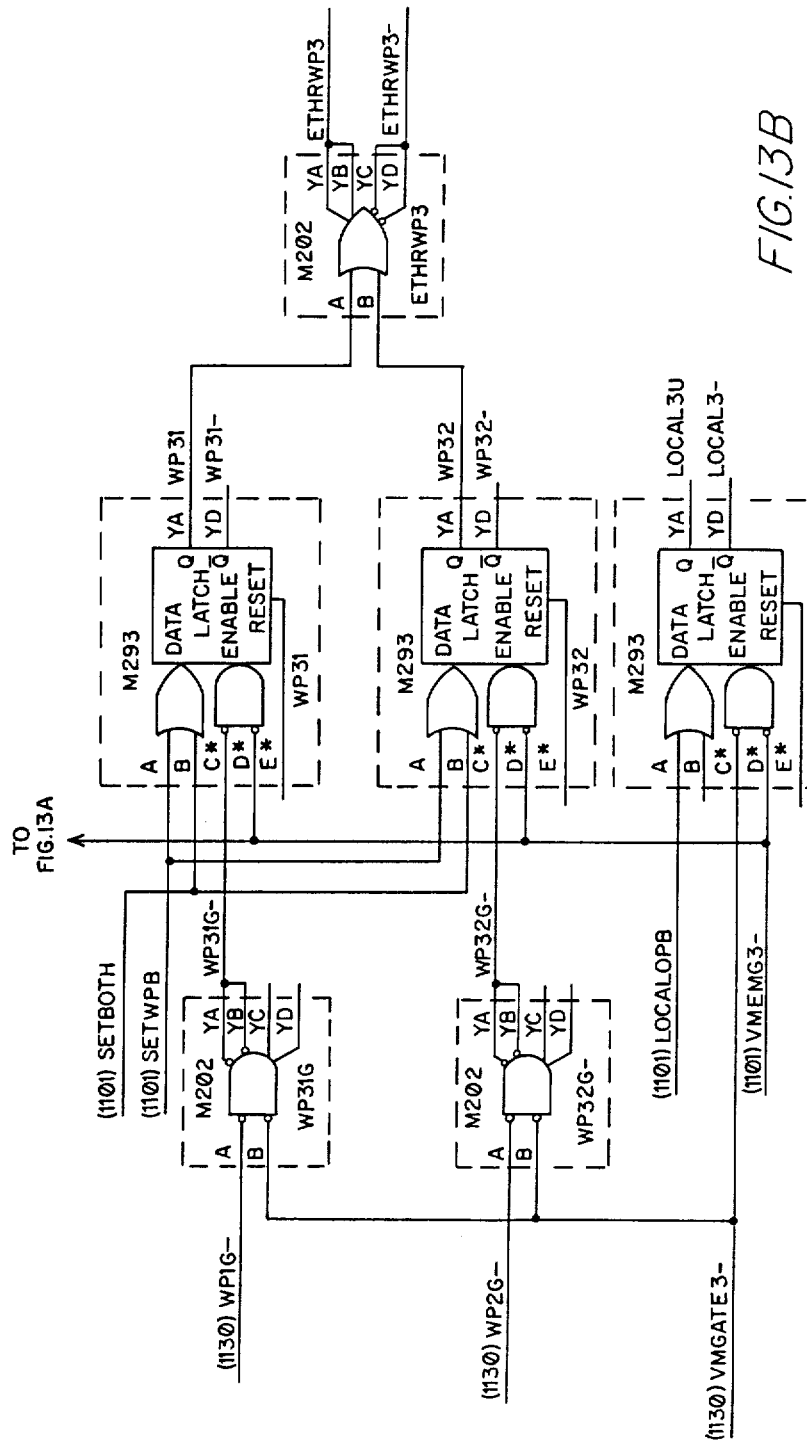

FIGS. 9A-9B, 10A-10B, 11A-11B, 12A-12B and 13A-13B show various portions of the valid and write pending flags buffer 43. FIGS. 9A-9B show the logic necessary for updating the flags in section 43 in response to instructions from the CPU and the information present on the write buffer pointer of the associative address section 41. FIGS. 10A-10B, 11A-11B, 12A-12B and 13A-13B show schematics of each of the four actual valid and write pending flag registers of section 43, respectively. In FIGS 10A-13B, the first four latches in each FIG. (from the top of the page to the bottom) comprise the four validity registers. The fifth and sixth latches and the associated OR gate comprise the write pending register. The bottom-most latch shown in FIGS. 10A-13B is related to a feature which is not of concern to the present invention. The elements of the actual registers shown in FIGS. 10A-10B, 11A-11B, 12A-12B and 13A-13B are part of the prior art and, therefore, these schematics will not be discussed detail herein.

FIGS. 14, 15, 16 and 17 show the combinational logic in memory timer operation scheduler 45 associated with each of the valid and write pending registers of section 43 shown in FIGS. 8, 10A-10B, 11A-11B, 12A-12B, and 13A-13B, respectively. The combinational logic in each of these FIGS. accepts, at its inputs, the outputs of the valid and write pending registers of FIGS. 10A-13B as well as the output of the last written register of FIG. 8 and decodes the information to output two bits of information, bits 85 and 87, which bits indicate, respectively; (1) whether there are 64 bits of valid data in the associated register or not, and (2) whether these are 32 bits of aligned valid data in the associated register or not. Note that the associated inhibit signal 83 from the last written register of FIG. 8 is also provided as one of the inputs to the combinational circuitry in FIGS. 14, 15, 16 and 17. If the associated inhibit bit is high, the circuitry in these FIGS. is prevented from indicating that there is valid data in the associated register, even if such is the case. In this manner, the last written register will always be inhibited from indicating that there are 32 or 64 valid bits of data, thereby preventing it from being read from as long as it remains the last written register.

Figure 14:
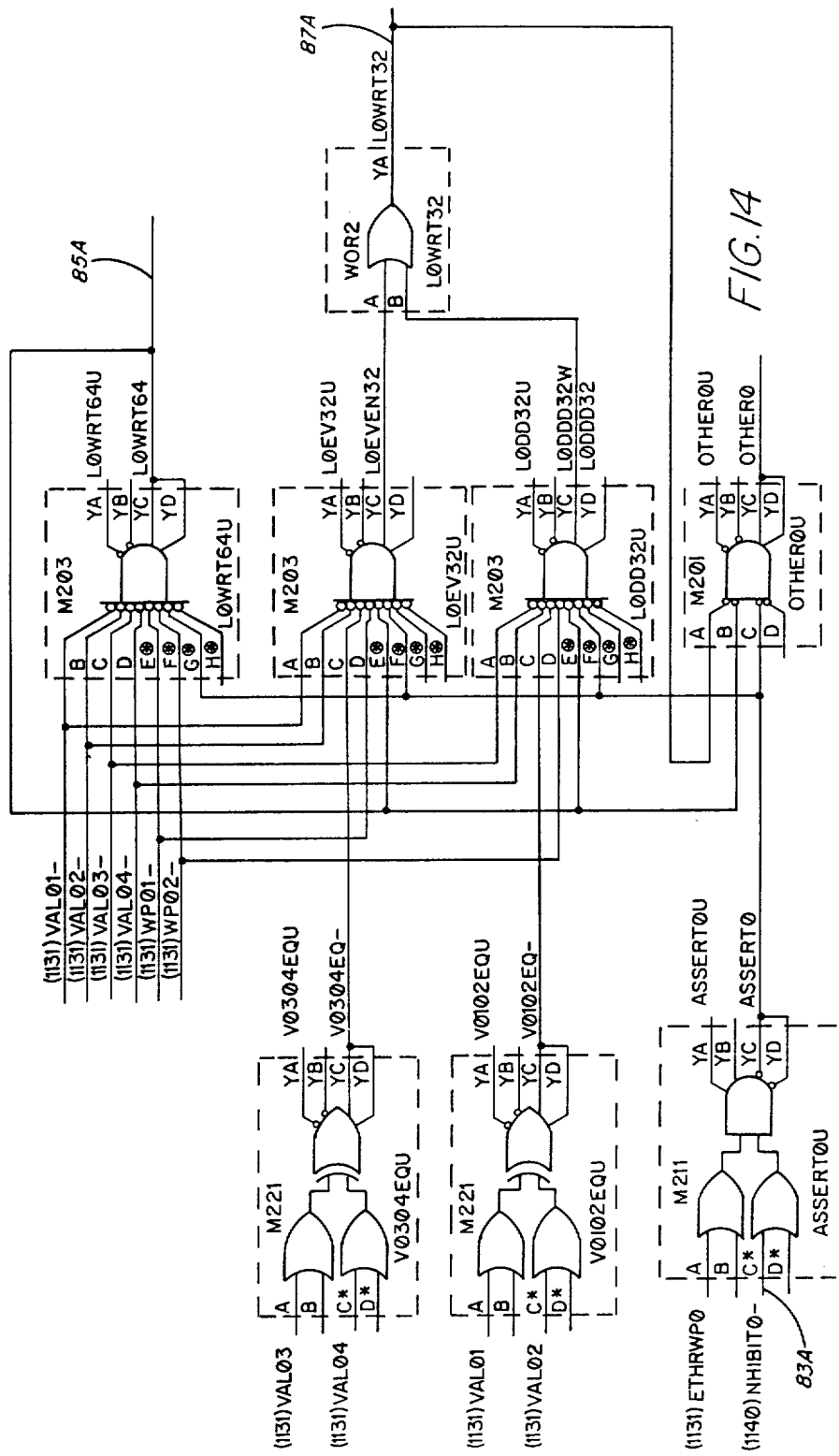
FIGS. 14, 15, 16 and 17 are schematic diagrams of the input section of the memory timer operation scheduler section shown in FIG. 4.
Figure 15:
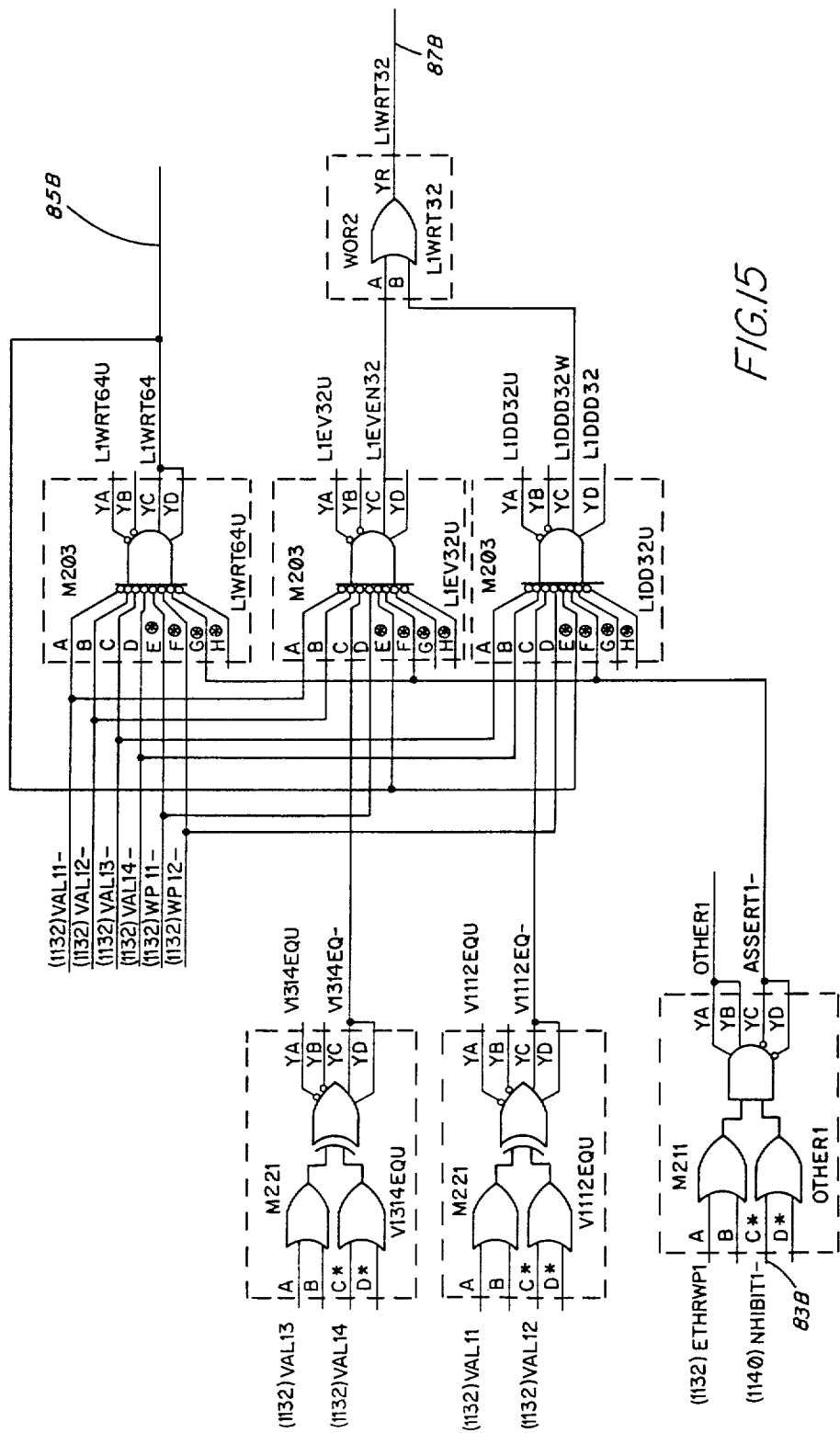
Figure 16:
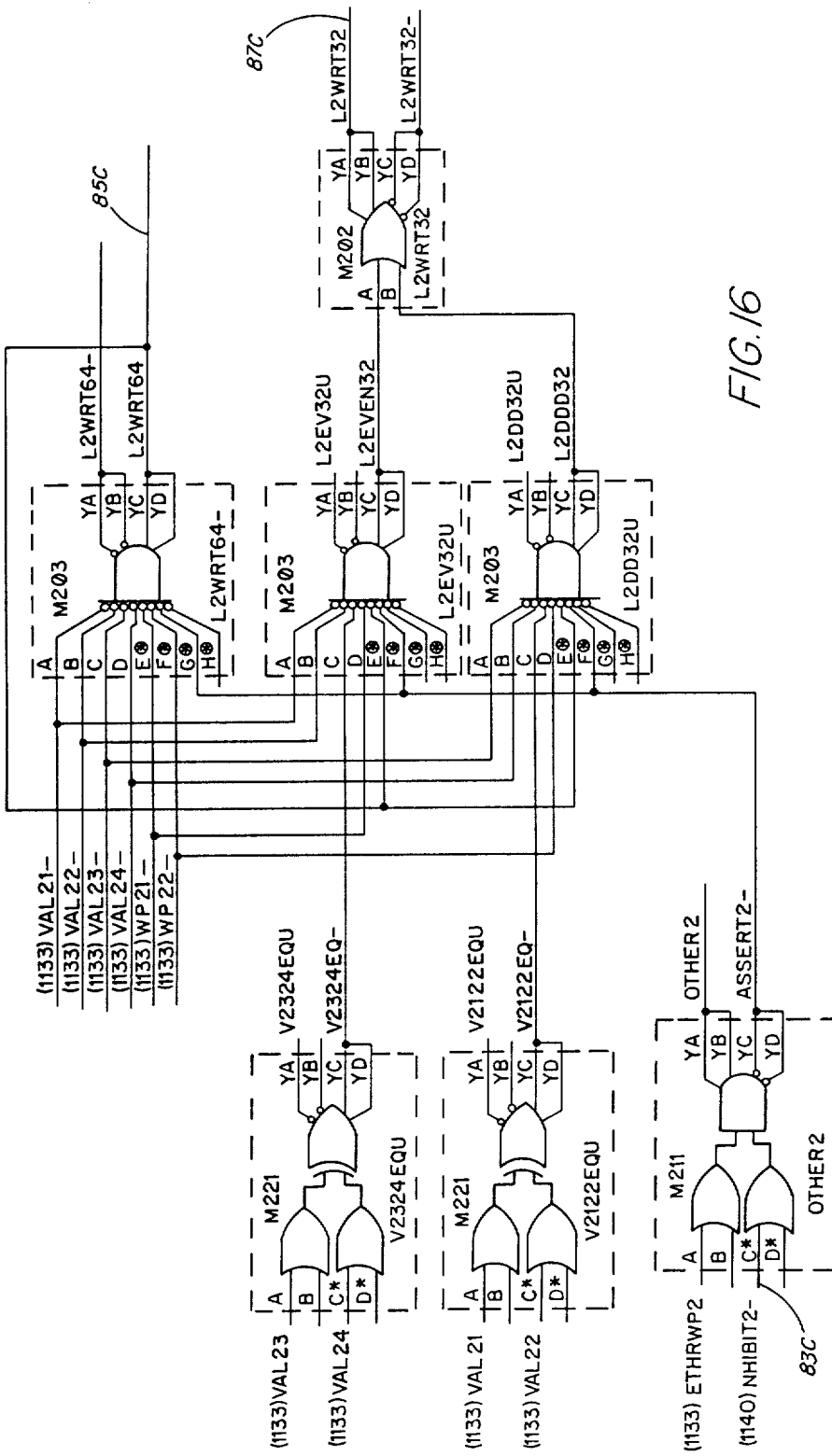
Figure 17:
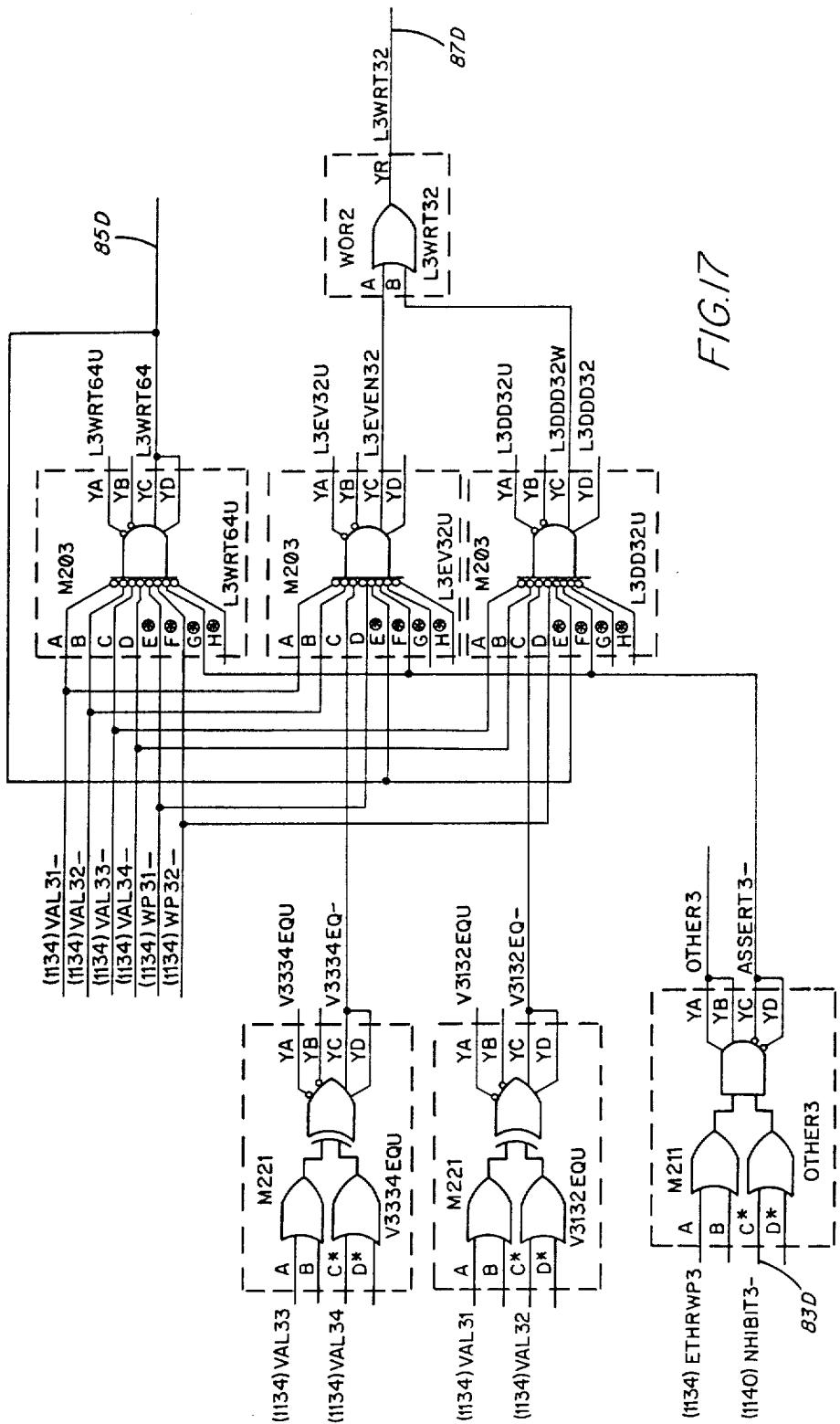

FIG. 14 shows a third output for the particular register which this circuitry is associated with (valid and write pending register 0 of FIGS. 5–7 and 10A–10B). This third output, labeled OTHER, pertains to a feature which is not relevant to the subject matter claimed in this application and, therefore, will not be described here. The circuitry associated with register 0 shown in FIG. 14 is otherwise identical to the circuitry associated with registers 1, 2 and 3 shown in FIGS. 15, 16 and 17 respectively.

Figures 18A, 18B:
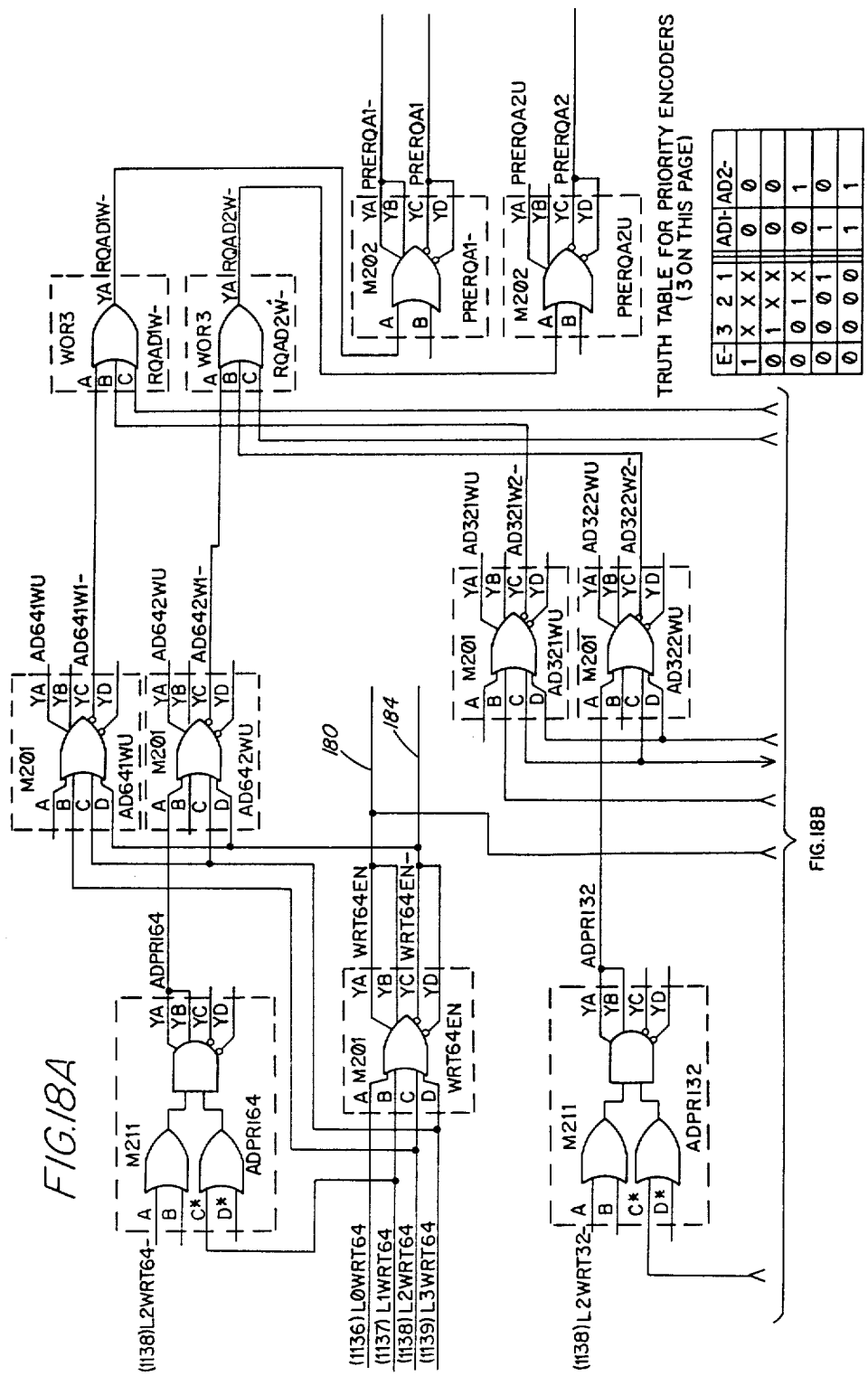
FIGS. 18A-18B are a schematic diagram of another portion of memory timer operation scheduler 45.
Figure 18B:
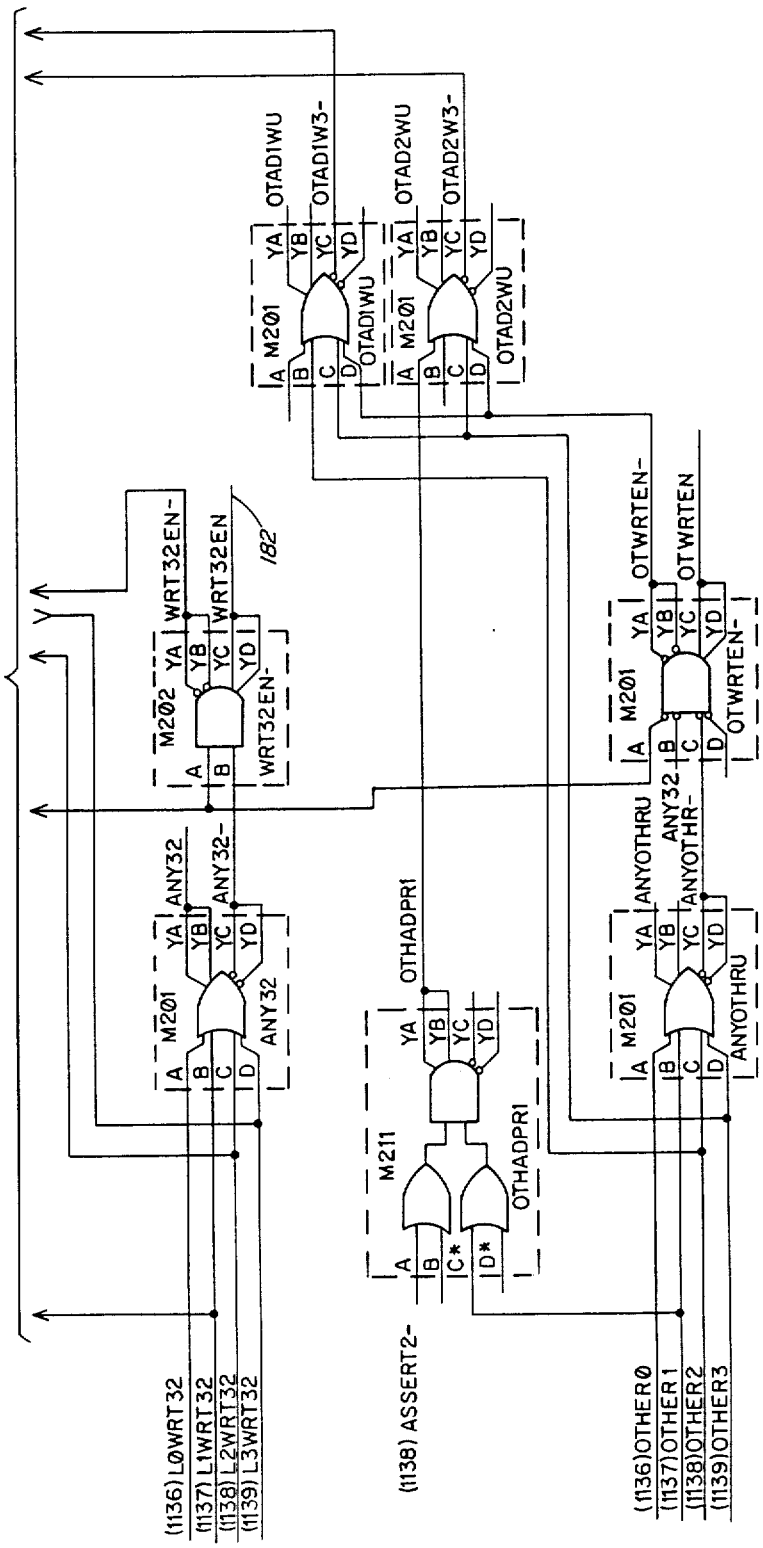
Figure 19A:
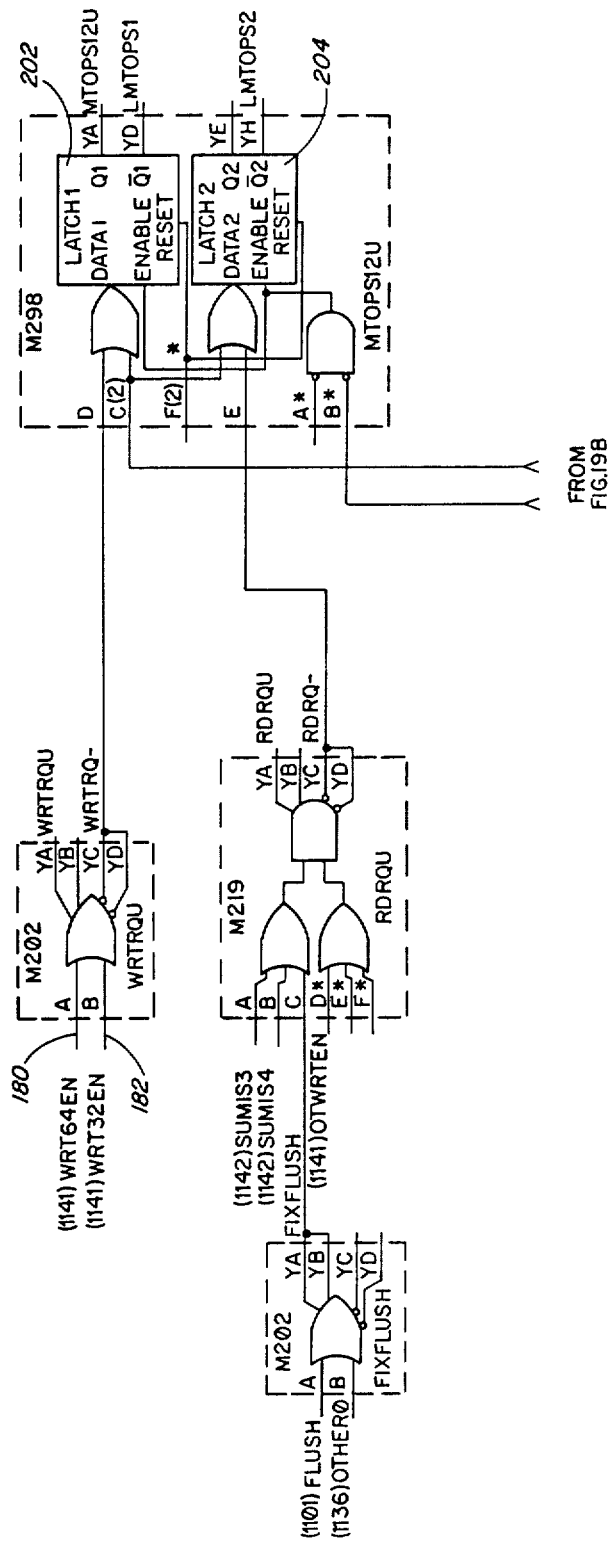
FIGS. 19A-19B are a schematic diagram of the output portion of the memory timer operation scheduler shown in FIG. 4.
Figure 19B:
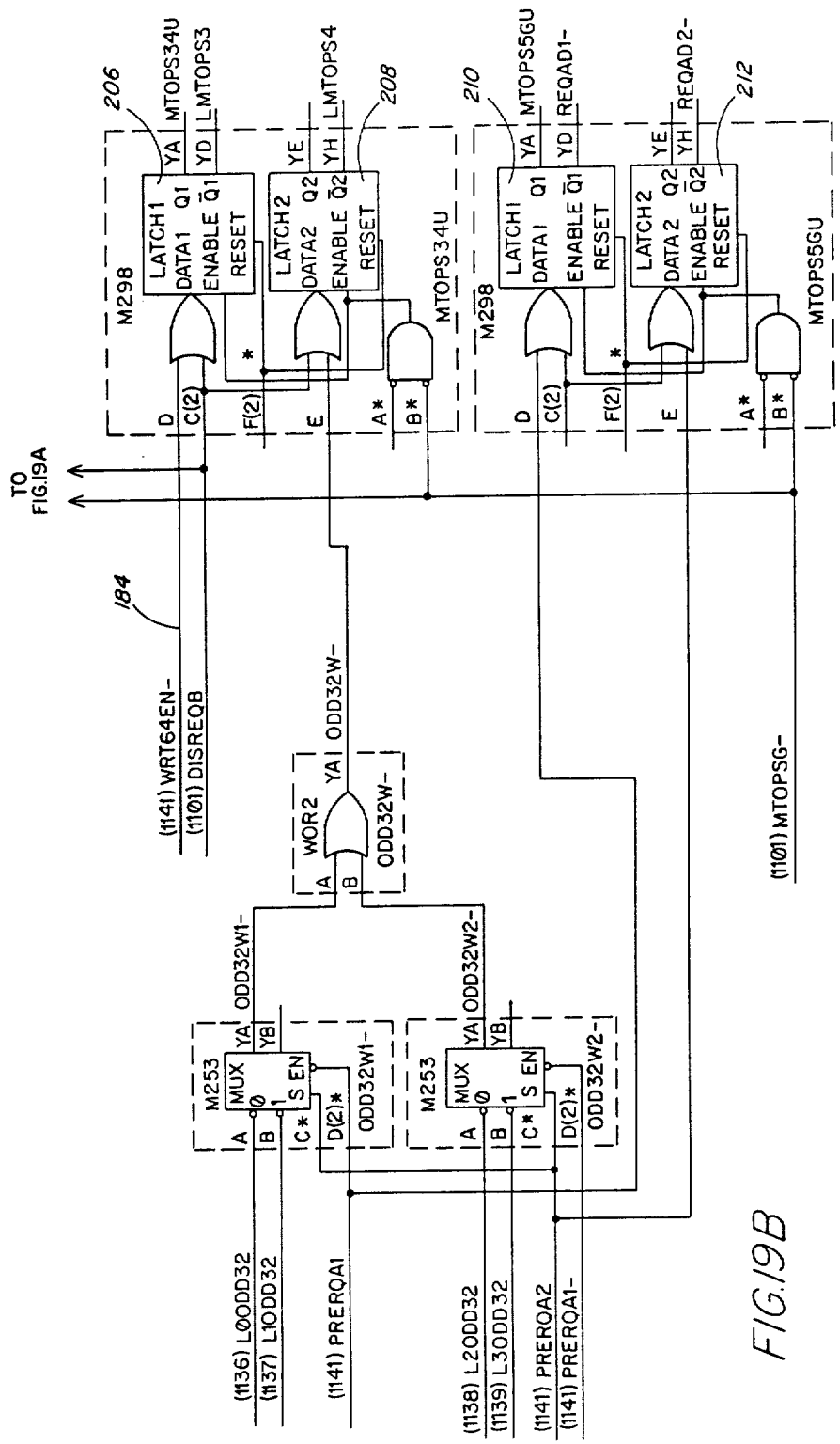

The outputs of these decoders are forewarded to the memory timer operation scheduler circuitry shown in FIGS. 18A–18B and 19A–19B. The combinational logic shown in FIG. 18A–18B calculates two two bit address of the write buffer data register location which is to be emptied next, based on the two bits of information presented at its inputs from each of the combinational logic circuits shown in FIGS. 14, 15, 16 and 17. The two bit address which is calculated in the circuitry of FIG. 18A–18B is forwarded to latches 210 and 212 in FIG. 19A–19B where the address is held. The circuitry in FIG. 19A–19B comprises four more latches in addition to register address latches 210 and 212. Latch 202 accepts data from outputs 180 and 182 in FIG. 18A–18B which outputs indicate if there is 64 bits or 32 bits of valid data in any of the registers and if so, outputs a write enable signal. If there is neither a 64 bit aligned register or a 32 bit aligned portion of a register, but there are three or more "other" quantities, output latch 204 outputs a read enable signal to memory in order to initiate the filling in of the black spaces in order to create an aligned 32 bit or 64 bit quantity as described in relation to FIGS. 6 and 7.

Latch 206 latches on to the data from output 184 of FIG. 18A–18B which indicates whether there is a 64 bit quantity available. The output of register 206 indicates a 64 bit write is ready if in a first state or a 32 bit write if in a second state. Latch 208 accepts inputs from the memory timer operation scheduler circuitry shown in FIGS. 14–17 described above and indicates at its output whether the first 32 bits or second 32 bits of the selected register are to be written out. The outputs of registers 202, 204, 206 and 208 are forwarded to the memory controller which instructs the memory to perform a function as indicated by those registers. The request address which constitutes the output of registers 210 and 212 remains within the write buffer and selects the register in the data section 42 which is to be written out of (or read to).

It will thus be seen that the invention efficiently attains the objects set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. Digital processing apparatus comprising:
   A. a central processor;
   B. a memory having a plurality of memory locations;
   C. a write buffer operatively associated with said memory, said write buffer including (i) n write buffer locations for storing data received from said central processor, where n is an integer greater than one, (ii) means for merging data designated by said central processor for subsequent storage in contiguous locations in said memory, and (iii) write means for selectively writing said data from said plurality of write buffer locations to said memory;
   D. time stamp register means, in communication with said merge means, for storing and updating a time signal representative of the write buffer location having most recently received data stored therein; and,
   E. controller means, responsive in part to said time signal, for controlling said write means to select data for writing to memory from data stored in a candidate set of said locations in said write buffer, said candidate set not including the location represented by said time signal, whereby data in said location represented by said time signal are disregarded as a candidate for writing to memory and are stored pending the arrival of additional data.

2. Digital processing apparatus according to claim 1, wherein said time stamp register means comprises n time stamp registers;
   wherein a first of said time stamp registers stores and updates a first time signal representative of the buffer location having most recently received data, a last of said time stamp registers stores and updates a time signal representative of the buffer location having least recently received data, and intermediate ones of said time stamp registers collectively store and update an ordered string of time signals representative of the buffer locations having received data ranging in succession from next-most-recent to next-least-recent; and
   wherein said means for controlling said write means includes means operative to disregard data in the location represented by said first time signal as a candidate for writing to memory, and to select quantities of data designated for contiguous memory locations and contained in buffer locations indicated by time signals other than said first time signal for writing to memory in reverse rank order ranging from least recent to next-most-recent.

3. Digital processing apparatus according to claim 1, wherein
   A. each buffer location includes means for storing an m bit data word, where m is integer greater than one, and
   B. said buffer comprises (i) means for selecting and writing out to memory from among said buffer locations an m bit data quantity if at least one m bit quantity is stored in said buffer locations, (ii) means for selecting and writing out to memory from among said buffer locations a data quantity of less than m bits designated for contiguous memory locations if no m bit data quantities are stored in said buffer locations and at least one data quantity less than m bits designated for contiguous memory locations is stored in said locations, and (iii) means for reading data in from memory for merging with data quantities stored in said buffer locations.

4. Digital processing apparatus according to claim 2, wherein

A. each buffer location includes means for storing an m bit data word, where m is an integer greater than one, and B. said buffer comprises (i) means responsive to said time stamp register means for sequentially selecting and writing to memory m bit data quantities from least recently received to most recently received, unless said most recently received quantity is in the location represented by said first time signal, (ii) means responsive to said time stamp register means for sequentially selecting and writing out to memory, if no m bit data quantities are stored in locations other than that indicated by said first time stamp register, data quantities of less than m bits designated for contiguous memory locations, from least recently received to most recently received, unless said most recently received data of less than m bits is in the location represented by said first time signal, and (iii) means for reading data in from memory for merging with data quantities stored in said locations.

5. Digital processing apparatus according to claim 4, further comprising:

A. write pending flag means for indicating buffer locations containing data for writing out to memory, and B. wherein if fewer than a predetermined number of flags are turned on, no data is written to memory but instead is stored pending additional data.

6. A write buffer for a digital processing apparatus having a main memory, said buffer comprising:

a plurality of data memory locations for temporarily storing data which is to be written to the main memory, means for aligning data in each memory location of the buffer such that data which is to be written to adjacent address locations in the main memory are aligned adjacently in the individual memory locations of the buffer, means for keeping track of the buffer location which most recently received data, means for preventing the writing of data to main memory from the buffer location which most recently received data.

7. A buffer as set forth in claim 6 wherein the means for tracking comprises a time stamp register for storing a code uniquely identifying a buffer location, and means, responsive to the writing of data into a data location, for storing in the time stamp register the code representing the buffer location to which the data was written.

8. A buffer as set forth in claim 7 further comprising means for identifying the location of data in the buffer which are valid and pending to be written to main memory.

9. A buffer as set forth in claim 8 wherein said means for identifying valid and pending data comprises a valid and write pending buffer comprising a flag memory location corresponding to each data memory location, each flag memory location storing data which defines the portions of the corresponding data memory location which contain valid and pending data, and means responsive to the writing of data into a data location, for updating the data in the corresponding flag memory location.

10. A write buffer for a digital processing apparatus having a main memory, said buffer comprising:

a plurality of data memory locations for temporarily storing data which is to be written to main memory, means for aligning data in each memory location of the buffer such that data which is written to the buffer, and which is to be written from the buffer to adjacent locations in the main memory, are aligned adjacently within the individual data memory locations of the buffer, means for keeping track of the order in which the data memory locations of the buffer were most recently written to, and means for controlling the writing of data from the buffer to main memory such that, (i) the data in the data memory location most recently written to is not written to main memory unless the buffer is being deliberately emptied, (ii) if one or more data memory locations are completely filled with data which is to be written to main memory, the location corresponding to the least most recently written to data memory location in the buffer is written out to main memory.

(iii) if there are no data memory locations which are filled and one or more data memory locations which are partially filled with data which is to be written to main memory, the partially filled data location which is the least most recently written to buffer location is written to main memory, (iv) if none of the above is true, no action is taken.

11. A buffer as set forth in claim 10, wherein the means for tracking comprises a push-down stack register and wherein, when data is written into a data location, the address of that data location is placed on the stack.

12. A buffer as set forth in claim 10 further comprising means for identifying the location of data in the buffer which are valid and pending to be written to main memory.

13. A buffer as set forth in claim 10 wherein said means for identifying valid and pending data comprises a valid and write pending buffer comprising a flag memory location corresponding to each data memory location which contain valid and pending data, and means responsive to the writing of data into a data location, for updating the data in the flag memory location in the corresponding flag memory location.

* * * * *